(12) United States Patent
Park et al.

(10) Patent No.: US 12,010,331 B2
(45) Date of Patent: *Jun. 11, 2024

(54) METHOD AND APPARATUS FOR IMAGE ENCODING, AND METHOD AND APPARATUS FOR IMAGE DECODING

(71) Applicant: SAMSUNG ELECTRONICS CO., LTD., Suwon-si (KR)

(72) Inventors: Minwoo Park, Suwon-si (KR); Minsoo Park, Suwon-si (KR); Kiho Choi, Suwon-si (KR); Narae Choi, Suwon-si (KR); Woongil Choi, Suwon-si (KR); Chanyul Kim, Suwon-si (KR); Seungsoo Jeong, Suwon-si (KR); Anish Tamse, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,712

(22) Filed: Jan. 27, 2023

(65) Prior Publication Data
US 2023/0232023 A1   Jul. 20, 2023

Related U.S. Application Data

(63) Continuation of application No. 17/053,571, filed as application No. PCT/KR2019/005673 on May 10, 2019, now Pat. No. 11,616,963.
(Continued)

(51) Int. Cl.
H04N 19/119 (2014.01)
H04N 19/122 (2014.01)
(Continued)

(52) U.S. Cl.
CPC ......... *H04N 19/186* (2014.11); *H04N 19/119* (2014.11); *H04N 19/122* (2014.11); *H04N 19/176* (2014.11); *H04N 19/70* (2014.11)

(58) Field of Classification Search
None
See application file for complete search history.

(56) References Cited

U.S. PATENT DOCUMENTS 8,208,742 B2    6/2012    Cheon
9,215,461 B2   12/2015    Kim et al.
(Continued)

FOREIGN PATENT DOCUMENTS

CN     105308966 A    2/2016
EP     3614669 A1     2/2020
(Continued)

OTHER PUBLICATIONS

International Search Report (PCT/ISA/210) dated Aug. 22, 2019 issued by the International Searching Authority in International Application No. PCT/KR2019/005673.
(Continued)

*Primary Examiner* — Mohammad J Rahman
(74) *Attorney, Agent, or Firm* — Sughrue Mion, PLLC

(57) ABSTRACT

Provided is an image decoding method including determining a plurality of coding units in a chroma image by hierarchically splitting the chroma image, based on a split shape mode of blocks in the chroma image of a current image, and decoding the current image, based on the plurality of coding units in the chroma image. In this regard, the determining of the plurality of coding units in the chroma image may include, when a size or an area of a chroma block from among a plurality of chroma blocks to be generated by splitting a current chroma block in the chroma image is equal to or smaller than a preset size or a preset area, not
(Continued)

allowing splitting of the current chroma block based on a split shape mode of the current chroma block, and determining at least one coding unit included in the current chroma block.

5 Claims, 26 Drawing Sheets

Related U.S. Application Data

(60) Provisional application No. 62/683,255, filed on Jun. 11, 2018, provisional application No. 62/669,667, filed on May 10, 2018.

(51) Int. Cl.
*H04N 19/176* (2014.01)
*H04N 19/186* (2014.01)
*H04N 19/70* (2014.01)

(56) References Cited

U.S. PATENT DOCUMENTS

| | | | |
|---|---|---|---|
| 9,264,708 B2 | 2/2016 | Cheon | |
| 10,728,562 B2 | 7/2020 | Yi et al. | |
| 2003/0118110 A1 | 6/2003 | Chung | |
| 2004/0062445 A1 | 4/2004 | Kim | |
| 2006/0098884 A1 | 5/2006 | Kim | |
| 2009/0190659 A1 | 7/2009 | Lee | |
| 2010/0054586 A1* | 3/2010 | Yamazaki | G06V 30/18086 382/164 |
| 2010/0238316 A1* | 9/2010 | Kim | H04N 23/88 382/165 |
| 2011/0150080 A1* | 6/2011 | Watanabe | H04N 19/176 375/240.03 |
| 2013/0107970 A1 | 5/2013 | Wang | |
| 2013/0230102 A1 | 9/2013 | Lasserre | |
| 2013/0272621 A1 | 10/2013 | Lasserre | |
| 2014/0029860 A1* | 1/2014 | Rundo | H04N 19/597 382/233 |
| 2014/0072215 A1 | 3/2014 | Terada et al. | |
| 2014/0105291 A1 | 4/2014 | Nakamura et al. | |
| 2015/0117549 A1* | 4/2015 | Matsubara | H04N 19/436 375/240.01 |
| 2015/0288961 A1 | 10/2015 | Kim | |
| 2017/0347128 A1 | 11/2017 | Panusopone et al. | |
| 2018/0035123 A1* | 2/2018 | Wennersten | H04N 19/44 |
| 2018/0098074 A1 | 4/2018 | Heo | |
| 2019/0200021 A1 | 6/2019 | Park | |
| 2019/0215537 A1 | 7/2019 | Poirier et al. | |
| 2019/0238863 A1 | 8/2019 | Yoo | |
| 2019/0246106 A1 | 8/2019 | Park et al. | |
| 2019/0246131 A1 | 8/2019 | Park | |
| 2019/0273926 A1 | 9/2019 | Heo | |
| 2019/0349582 A1 | 11/2019 | Bordes | |
| 2020/0036985 A1 | 1/2020 | Jang | |
| 2020/0077094 A1 | 3/2020 | Poirier | |
| 2020/0413103 A1* | 12/2020 | Zhao | H04N 19/119 |
| 2021/0120242 A1 | 4/2021 | Nam | |

FOREIGN PATENT DOCUMENTS

| | | | |
|---|---|---|---|
| KR | 10-2014-0139459 A | 12/2014 | |
| KR | 101635830 B1 | 7/2016 | |
| KR | 101662739 B1 | 10/2016 | |
| WO | 2018065302 A1 | 4/2018 | |
| WO | 2018066809 A1 | 4/2018 | |
| WO | 2018070550 A1 | 4/2018 | |
| WO | 2019009502 A1 | 1/2019 | |

OTHER PUBLICATIONS

Communication dated Aug. 29, 2022 by Intellectual Property India in Indian Patent Application No. 202047050529.

Xiang Li et al., "Multi-Type-Tree", Joint Video Exploration Team (JVET) of ITU-T SG 16 WP 3 and ISO/IEC JTC 1/SC 29/WG 11, Oct. 2016, 3 pages total.

Sunmi Yoo et al., "Suggested fix on QTBT", Joint Video Exploration Team (JVET) of ITU-T SG 16 WP 3 and ISO/IEC JTC 1/SC 29/WG 11, Oct. 2016, 4 pages total.

Jackie Ma et al., "Quadtree plus binary tree with shifting", (including software), Joint Video Exploration Team (JVET) of ITU-T SG 16 WP 3 and ISO/IEC JTC 1/SC 29/WG 11, Apr. 2018, 23 pages total.

Huanbang Chen et al., "Description of SDR, HDR and 360° video coding technology proposal by Huawei, GoPro, HiSilicon, and Samsung", Joint Video Exploration Team (JVET) of ITU-T SG 16 WP 3 and ISO/IEC JTC 1/SC 29/WG 11, Apr. 2018, 135 pages total.

Communication dated Sep. 3, 2021 issued by the Korean Patent Office in counterpart Korean Application No. 10-2020-7022246.

Hsu, Chih-Wei et al., "Description of SDR video coding technology proposal by MediaTek", Joint Video Experts Team (JVET) of ITU-T SG 16 WP 3 and ISO/IEC JTC 1/SC 29/WG 11, 10th Meeting: San Diego, US Apr. 10-20, 2018, Document: JVET-J0018, XP030248125. (64 pages total).

Communication dated Mar. 25, 2022 by the European Patent Office in counterpart European Patent Application No. 19798875.1.

Communication dated Aug. 31, 2023 issued by the Chinese Patent Office in counterpart Chinese Application No. 201980045982.7.

* cited by examiner

FIG. 13

| DEPTH / BLOCK SHAPE | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

METHOD AND APPARATUS FOR IMAGE ENCODING, AND METHOD AND APPARATUS FOR IMAGE DECODING

CROSS-REFERENCE TO RELATED APPLICATIONS

This application is a continuation application of U.S. patent application Ser. No. 17/053,571, filed on Nov. 6, 2020, which is a National Stage Entry Application of International Application No. PCT/KR2019/005673, filed on May 10, 2019, which claims priority to U.S. Provisional Patent Application No. 62/683,255, filed on Jun. 11, 2018, and U.S. Provisional Patent Application No. 62/669,667, filed on May 10, 2018, in the U.S. Patent and Trademark Office, the disclosures of which are incorporated by reference herein in their entireties.

TECHNICAL FIELD

A method and apparatus according to an embodiment may encode or decode an image by using various-shape coding units included in the image. A method and apparatus according to an embodiment may determine at least one coding unit by hierarchically splitting a chroma image, and may encode or decode the chroma image by using the at least one coding unit.

BACKGROUND ART

As hardware capable of reproducing and storing high-resolution or high-quality image content has been developed and become widely popular, a codec capable of efficiently encoding or decoding the high-resolution or high-quality image content is in high demand. The encoded image content may be reproduced by decoding it. Recently, methods of effectively compressing high-resolution or high-quality image content are used. For example, an efficient image compression method is implemented through a process of randomly processing an image to be encoded.

Various data units may be used to compress images, and an inclusion relation may exist between the data units. A data unit may be split by using various methods to determine a size of the data unit to be used in image compression, and then an optimal data unit may be determined based on a characteristic of an image, such that the image may be encoded or decoded.

DESCRIPTION OF EMBODIMENTS

Solution to Problem

According to an embodiment of the disclosure, an image decoding method includes: determining a plurality of coding units in a luma image by hierarchically splitting the luma image, based on a split shape mode of blocks included in the luma image of a current image; determining a plurality of coding units in a chroma image by hierarchically splitting the chroma image, based on a split shape mode of blocks in the chroma image of the current image; and decoding the current image, based on the determined plurality of coding units in the luma image and the determined plurality of coding units in the chroma image, and wherein the split shape mode is a mode based on at least one of a split direction and a split type of a block, and wherein the determining of the plurality of coding units in the chroma image includes, when a size or an area of a chroma block from among a plurality of chroma blocks to be generated by splitting a current chroma block in the chroma image is equal to or smaller than a preset size or a preset area, not allowing splitting of the current chroma block based on a split shape mode of the current chroma block, and determining at least one coding unit included in the current chroma block.

According to an embodiment of the disclosure, an image decoding apparatus includes: at least one processor configured to determine a plurality of coding units in a luma image by hierarchically splitting the luma image, based on a split shape mode of blocks included in the luma image of a current image, determine a plurality of coding units in a chroma image by hierarchically splitting the chroma image, based on a split shape mode of blocks in the chroma image of the current image, and decode the current image, based on the determined plurality of coding units in the luma image and the determined plurality of coding units in the chroma image, and wherein the split shape mode is a mode based on at least one of a split direction and a split type of a block, and when the at least one processor determines the plurality of coding units in the chroma image, and when a size or an area of a chroma block from among a plurality of chroma blocks to be generated by splitting a current chroma block in the chroma image is equal to or smaller than a preset size or a preset area, the at least one processor is configured to not allow splitting of the current chroma block based on a split shape mode of the current chroma block, and determine at least one coding unit included in the current chroma block.

According to an embodiment of the disclosure, an image encoding method includes: determining a plurality of coding units in a luma image by hierarchically splitting the luma image, based on a split shape mode of blocks included in the luma image of a current image; determining a plurality of coding units in a chroma image by hierarchically splitting the chroma image, based on a split shape mode of blocks included in the chroma image of the current image; and encoding the current image, based on the determined plurality of coding units in the luma image and the determined plurality of coding units in the chroma image, and wherein the split shape mode is a mode based on at least one of a split direction and a split type of a block, and wherein the determining of the plurality of coding units in the chroma image includes, when a size or an area of a chroma block from among a plurality of chroma blocks to be generated by splitting a current chroma block in the chroma image is equal to or smaller than a preset size or a preset area, not allowing splitting of the current chroma block based on a split shape mode of the current chroma block, and determining at least one coding unit included in the current chroma block.

A computer program of an image encoding method or an image decoding method according to an embodiment of the disclosure may be recorded on a computer-readable recording medium.

BRIEF DESCRIPTION OF DRAWINGS

FIG. 13 illustrates a process of determining a depth of a coding unit as a shape and size of the coding unit change, when the coding unit is recursively split such that a plurality of coding units are determined, according to an embodiment.

BEST MODE

Figure 1A:
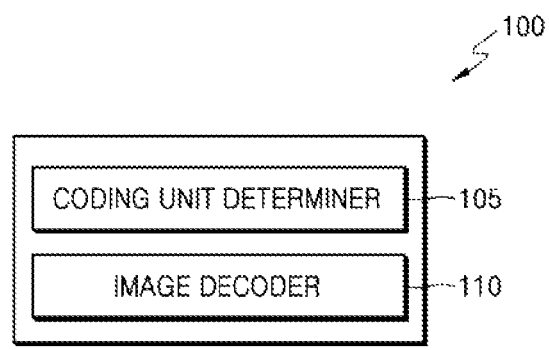
FIG. 1A is a block diagram of an image decoding apparatus, according to various embodiments.

According to an embodiment of the disclosure, an image decoding method includes: determining a plurality of coding units in a luma image by hierarchically splitting the luma image, based on a split shape mode of blocks included in the luma image of a current image; determining a plurality of coding units in a chroma image by hierarchically splitting the chroma image, based on a split shape mode of blocks in the chroma image of the current image; and decoding the current image, based on the determined plurality of coding units in the luma image and the determined plurality of coding units in the chroma image, and wherein the split shape mode is a mode based on at least one of a split direction and a split type of a block, and wherein the determining of the plurality of coding units in the chroma image includes, when a size or an area of a chroma block from among a plurality of chroma blocks to be generated by splitting a current chroma block in the chroma image is equal to or smaller than a preset size or a preset area, not allowing splitting of the current chroma block based on a split shape mode of the current chroma block, and determining at least one coding unit included in the current chroma block.

The split type may indicate one of binary split, tri split, and quad split.

The preset size may be one of 4×2, 2×4, and 2×2.

The preset area may be one of 8 and 4.

When the size or the area of the chroma block from among the plurality of chroma blocks to be generated by splitting the current chroma block in the chroma image is equal to or smaller than the preset size or the preset area, the not allowing of the splitting of the current chroma block based on the split shape mode of the current chroma block, and the determining of the at least one coding unit included in the current chroma block may include: determining whether the size or the area of the chroma block from among the plurality of chroma blocks to be generated by splitting the current chroma block in the chroma image is equal to or smaller than the preset size or the preset area, according to whether a condition based on a size or an area of the current chroma block and the split shape mode of the current chroma block is satisfied; and in response to a result of the determining, determining to not allow splitting of the current chroma block, based on the split shape mode of the current chroma block, and determining at least one coding unit included in the current chroma block.

The condition based on the size or the area of the current chroma block and the split shape mode of the current chroma block may correspond to a condition about whether a width or a height of the current chroma block is equal to or smaller than 4 when a split type of the current chroma block indicates quad split.

The condition based on the size or the area of the current chroma block and the split shape mode of the current chroma block may correspond to a condition about whether the area of the current chroma block is equal to or smaller than 16 when a split type of the current chroma block indicates binary split.

The condition based on the size or the area of the current chroma block and the split shape mode of the current chroma block may correspond to a condition about whether the area of the current chroma block is equal to or smaller than 32 when a split type of the current chroma block indicates binary split.

The split shape mode of the blocks in the chroma image of the current image may be independent from the split shape mode of the blocks included in the luma image of the current image.

The split shape mode of the blocks in the chroma image of the current image may be dependent on a split shape mode of blocks in the luma image of the current image, the blocks in the luma image corresponding to the blocks in the chroma image, and a size of the blocks in the chroma image may be determined based on a chroma sub sampling format of the current image and a size of the corresponding blocks in the luma image.

The image decoding method may further include, when a size of a block from among a plurality of blocks to be generated by splitting the current chroma block of the chroma image, based on the split shape mode of the current chroma block in the chroma image, is equal to or smaller than 2×N (where N is an integer equal to or greater than 2) or N×2, determining to not allow splitting of the current chroma block based on the split shape mode of the current chroma block, and determining at least one coding unit included in the current chroma block.

The determining of the plurality of coding units in the luma image by hierarchically splitting the luma image based on the split shape mode of the blocks included in the luma image of the current image may include: when a current luma block included in the luma image is located at a right boundary of a picture, obtaining, from a bitstream, a flag indicating a split type from among binary split and quad split; and determining at least one coding unit included in the current luma block, based on the obtained flag.

According to an embodiment of the disclosure, an image decoding apparatus includes: at least one processor configured to determine a plurality of coding units in a luma image by hierarchically splitting the luma image, based on a split shape mode of blocks included in the luma image of a current image, determine a plurality of coding units in a chroma image by hierarchically splitting the chroma image, based on a split shape mode of blocks in the chroma image of the current image, and decode the current image, based on the determined plurality of coding units in the luma image and the determined plurality of coding units in the chroma image, and wherein the split shape mode is a mode based on at least one of a split direction and a split type of a block, and when the at least one processor determines the plurality of coding units in the chroma image, and when a size or an area of a chroma block from among a plurality of chroma blocks to be generated by splitting a current chroma block in the chroma image is equal to or smaller than a preset size or a preset area, the at least one processor is configured to not allow splitting of the current chroma block based on a split shape mode of the current chroma block, and determine at least one coding unit included in the current chroma block.

According to an embodiment of the disclosure, an image encoding method includes: determining a plurality of coding units in a luma image by hierarchically splitting the luma image, based on a split shape mode of blocks included in the luma image of a current image; determining a plurality of coding units in a chroma image by hierarchically splitting the chroma image, based on a split shape mode of blocks included in the chroma image of the current image; and encoding the current image, based on the determined plurality of coding units in the luma image and the determined plurality of coding units in the chroma image, and wherein the split shape mode is a mode based on at least one of a split direction and a split type of a block, and wherein the determining of the plurality of coding units in the chroma image includes, when a size or an area of a chroma block from among a plurality of chroma blocks to be generated by splitting a current chroma block in the chroma image is equal to or smaller than a preset size or a preset area, not allowing splitting of the current chroma block based on a split shape mode of the current chroma block, and determining at least one coding unit included in the current chroma block.

A computer program of an image encoding method or an image decoding method according to an embodiment of the disclosure may be recorded on a computer-readable recording medium.

MODE OF DISCLOSURE

Advantages and features of embodiments and methods of accomplishing the same may be understood more readily by reference to the embodiments and the accompanying drawings. In this regard, the disclosure may have different forms and should not be construed as being limited to the embodiments set forth herein. Rather, these embodiments are provided so that this disclosure will be thorough and complete and will fully convey the concept of the disclosure to one of ordinary skill in the art.

The terms used in the specification will be briefly defined, and the embodiments will be described in detail.

All terms including descriptive or technical terms which are used in the specification should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

In the following descriptions, terms such as "unit" indicate software or a hardware component, and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

According to an embodiment of the disclosure, "unit" may be implemented as a processor and a memory. The term "processor" should be interpreted broadly to include a general purpose processor, a central processing unit (CPU), a microprocessor, a digital signal processor (DSP), a controller, a microcontroller, a state machine, and the like. In some environments, the "processor" may refer to an application specific integrated circuit (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configurations.

The term "memory" should be interpreted broadly to include any electronic component capable of storing electronic information. The term "memory" may refer to various types of processor-readable media, such as random access memory (RAM), read-only memory (ROM), non-volatile random access memory (NVRAM), programmable read-only memory (PROM), erase-programmable read-only memory (EPROM), electrically erasable PROM (EEPROM), flash memory, a magnetic or optical data storage device, registers, and the like. When the processor can read information from a memory and/or write information to the memory, the memory is stated to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "sample" denotes data assigned to a sampling position of an image, i.e., data to be processed. For example, pixel values of an image in a spatial domain and transform coefficients on a transform domain may be samples. A unit including at least one such sample may be defined as a block.

Hereinafter, the disclosure will now be described more fully with reference to the accompanying drawings for one of ordinary skill in the art to be able to perform the embodiments without any difficulty. In addition, portions irrelevant to the description will be omitted in the drawings for a clear description of the disclosure.

Hereinafter, an image encoding apparatus and an image decoding apparatus, and an image encoding method and an image decoding method according to various embodiments will be described with reference to FIGS. 1 to 20. With reference to FIGS. 3 to 16, a method of determining a data unit of an image according to various embodiments will be described, and with reference to FIGS. 1 and 2, and FIGS. 17 to 20, an image encoding apparatus and an image decoding apparatus, and an image encoding method and an image decoding method for encoding or decoding an image based on various-shape coding units according to various embodiments will be described.

Hereinafter, an encoding or decoding method and apparatus for encoding or decoding an image based on various-shape coding units according to an embodiment of the disclosure will now be described with reference to FIGS. 1 and 2.

FIG. 1A is a block diagram of an image decoding apparatus, according to various embodiments.

An image decoding apparatus 100 according to various embodiments may include a coding unit determiner 105 and an image decoder 110. The coding unit determiner 105 and the image decoder 110 may include at least one processor. Also, the coding unit determiner 105 and the image decoder 110 may include a memory storing instructions to be performed by the at least one processor. The image decoder 110 and the coding unit determiner 105 may be implemented as separate hardware components, or the image decoder 110 may include the coding unit determiner 105.

The coding unit determiner 105 may determine a plurality of coding units in a luma image by hierarchically splitting the luma image based on a split shape mode of blocks included in the luma image of a current image.

The coding unit determiner 105 may determine a plurality of coding units in a chroma image by hierarchically splitting the chroma image based on a split shape mode of blocks included in the chroma image of the current image.

The coding unit determiner 105 may determine whether a size or area of a chroma block is equal to or smaller than a preset size or area, wherein the chroma block is from among a plurality of chroma blocks that may be generated by splitting a current chroma block in the chroma image based on a split shape mode of the current chroma block in the chroma image. The split shape mode of the current chroma block may refer to a mode based on at least one of a split direction and a split type of a block.

Based on a result of the determination, the coding unit determiner 105 may determine to not allow splitting of the current chroma block based on the split shape mode of the current chroma block.

The coding unit determiner 105 may determine at least one coding unit included in the current chroma block, based on one split shape mode from among split shape modes of the current block which are allowed except for the split shape mode that is determined to not be allowed. When an allowed split shape mode of the current block does not exist, the coding unit determiner 105 may no longer perform splitting and may determine the current chroma block to be a coding unit.

When the coding unit determiner 105 determines that the size or area of the chroma block is equal to or smaller than the preset size or area, wherein the chroma block is from among the plurality of chroma blocks that may be generated by splitting the current chroma block in the chroma image based on the split shape mode of the current chroma block in the chroma image, the coding unit determiner 105 may determine to not allow splitting of the current chroma block based on the split shape mode of the current chroma block. In this regard, the preset size may be one of 4×2, 2×4, and 2×2. Also, the preset area may be one of 8 and 4.

According to whether a condition based on a size or area of the current chroma block and the split shape mode of the current chroma block is satisfied, the coding unit determiner 105 may determine whether the size or area of the chroma block is equal to or smaller than the preset size or area, wherein the chroma block is from among the plurality of chroma blocks that may be generated by splitting the current chroma block in the chroma image based on the split shape mode of the current chroma block in the chroma image. In this regard, the condition based on the size or area of the current chroma block and the split shape modes of the current block may refer to a condition about whether a width or height of the current chroma block is equal to or smaller than 4 when a split type of the current chroma block indicates quad split. When the split type of the current chroma block indicates quad split and the size or width of the current chroma block is equal to or smaller than 4, the coding unit determiner 105 may determine to not allow splitting based on quad split. That is, a height or width of a chroma block from among a plurality of chroma blocks generated by quad splitting the current chroma block when the height or width of the current chroma block is equal to or smaller than 4 may be equal to or smaller than 2. Therefore, a size of the chroma block from among the plurality of chroma blocks generated by quad splitting the current chroma block may be 2×2, 4×2, or 2×4 (or a smaller size), and when the size of such block is allowed as a coding unit and the block is encoded, a throughput may be decreased such that, in order to increase the throughput, quad split of the current block may be determined to not be allowed.

The coding unit determiner 105 may split the current chroma block based on another allowed split type except for quad split. When an allowed split type for the current chroma block does not exist, the coding unit determiner 105 may no longer perform splitting and may determine the current chroma block to be a coding unit.

The condition based on the size or area of the current chroma block and the split shape modes of the current block may refer to a condition about whether an area of the current chroma block is equal to or smaller than 16 when a split type of the current chroma block indicates binary split. When the split type of the current chroma block indicates binary split and the area of the current chroma block is equal to or smaller than 16, the coding unit determiner 105 may determine to not allow splitting based on binary split. That is, a size of a chroma block from among a plurality of chroma blocks generated by binary splitting the current chroma block when the area of the current chroma block is equal to or smaller than 16 (e.g., when a size of the current chroma block is equal to or smaller than 2×8, 8×2, or 4×4) may be equal to or smaller than 2×4, or 4×2. When the size of such block is allowed as a coding unit and the block is encoded, a throughput may be decreased such that, in order to increase the throughput, binary split of the current block may be determined to not be allowed. The coding unit determiner 105 may split the current chroma block based on another allowed split type except for binary split. When an allowed split type for the current chroma block does not exist, the coding unit determiner 105 may no longer perform splitting and may determine the current chroma block to be a coding unit.

The condition based on the size or area of the current chroma block and the split shape modes of the current block may refer to a condition about whether an area of the current chroma block is equal to or smaller than 32 when a split type of the current chroma block indicates tri split (also referred to as the triple split). When the split type of the current chroma block indicates tri split and the area of the current chroma block is equal to or smaller than 32, the coding unit determiner 105 may determine to not allow splitting based on tri split. That is, a size of a chroma block from among a plurality of chroma blocks generated by tri splitting the current chroma block when the area of the current chroma block is equal to or smaller than 32 (e.g., when a size of the current chroma block is equal to or smaller than 4×8, 8×4, 2×16, or 16×2) may be equal to or smaller than 2×4, or 4×2. When the size of such block is allowed as a coding unit and the block is encoded, a throughput may be decreased such that, in order to increase the throughput, tri split of the current block may be determined to not be allowed. The coding unit determiner 105 may split the current chroma block based on another allowed split type except for tri split. When an allowed split type for the current chroma block does not exist, the coding unit determiner 105 may no longer perform splitting and may determine the current chroma block to be a coding unit.

A split shape mode of blocks in a chroma image of a current image may be independent from a split shape mode of blocks included in a luma image of the current image, but the disclosure is not limited thereto, and thus, the split shape mode of the blocks in the chroma image of the current image may be dependent on a split shape mode of corresponding blocks included in a luma image of the current image which correspond to the blocks in the chroma image.

That is, the coding unit determiner 105 may determine a plurality of coding units in the luma image by hierarchically splitting the luma image based on the split shape mode of the blocks included in the luma image of the current image, and may determine a plurality of coding units in the chroma image by hierarchically splitting the chroma image, based on a split shape mode of blocks included in the chroma image which is equal to the split shape mode of the blocks included in the luma image. In this regard, the coding unit determiner 105 may determine a size of a block in the chroma image, based on a chroma sub sampling scheme of the current block and a size of a corresponding block of the luma image. For example, when the chroma sub sampling scheme refers to YUV 4:2:0, and the size of the corresponding block of the luma image refers to 16×16, the size of the block in the chroma image may be determined to be 8×8.

When a size of a block is equal to or smaller than 2×N (where N is an integer equal to or greater than 2) or N×2, wherein the block is from among a plurality of blocks generated by splitting the current chroma block in the chroma image based on the split shape mode of the current chroma block in the chroma image, the coding unit determiner 105 may determine to not allow splitting of the current chroma block based on the split shape mode of the current chroma block. The coding unit determiner 105 may determine at least one coding unit included in the current chroma block based on allowable split types excluding the disallowed split type.

The image decoder 110 may decode the current image, based on the plurality of coding units in the luma image and the plurality of coding units in the chroma image.

Each of luma blocks split from each inter slice or picture may have a different prediction mode. For example, each luma block may have an inter or intra prediction mode. In this case, the image decoding apparatus 100 may determine a prediction mode of a corresponding chroma block to be as below. When a current slice or picture is an inter slice or picture, and a ratio of an area of a luma block having an intra prediction mode to an area of a luma block is equal to or greater than a preset value, the image decoding apparatus 100 may determine a prediction mode of a chroma block to be an intra prediction mode.

When a current slice or picture is an inter slice or picture, and a ratio of an area of a luma block having an inter prediction mode to an area of a luma block is equal to or greater than a preset value, the image decoding apparatus 100 may determine a prediction mode of a chroma block to be an inter prediction mode.

When a luma block having a particular size is split, the image decoding apparatus 100 may obtain, from a bitstream, information about a prediction mode of a corresponding chroma block.

The image decoding apparatus 100 may determine a prediction mode of a luma block to be a prediction mode of a chroma block, the luma block corresponding to a particular location of the chroma block. For example, the particular location may be an upper-left location, a center location, a lower-left location, a top location, a lower-right location, and the like. In this regard, the particular location may be a predefined location, but the disclosure is not limited thereto, and the image decoding apparatus 100 may obtain information about the particular location from a separate bitstream, and may determine the particular location based on the obtained information.

In order to improve a throughput, the image decoding apparatus 100 may perform operations below when a size of a current block is equal to or smaller than a particular size or an area of the current block is equal to or smaller than a particular value.

The image decoding apparatus 100 may inverse transform the current block by using a transformation method other than a transformation method such as a Discrete Cosine Transform (DCT). For example, when the size of the current block is smaller than 4×4, the image decoder 110 may inverse transform the current block by using the Hadamard transform.

The image decoding apparatus 100 may set a value of a transform skip flag about the current block to be constantly 1. For example, the image decoding apparatus 100 may obtain a transform skip flag about the current block from a bitstream, and may set a value of the transform skip flag based on the value of the transform skip flag obtained from the bitstream. However, when the size of the current block is equal to or smaller than a particular size or the area of the current block is equal to or smaller than a particular value, the image decoding apparatus 100 may not obtain the transform skip flag from the bitstream and may set the value of the transform skip flag about the current block to be 1.

The transform skip flag refers to a flag indicating whether transformation is to be used, and when the value of the transform skip flag is 0, the image decoding apparatus 100 may not perform an inverse-transformation operation and may reconstruct the current block by using a de-quantized block, and when the value is 1, the image decoding apparatus 100 may generate an inverse-transformed block by performing the inverse-transformation operation on the de-quantized block, and may reconstruct the current block by using the inverse-transformed block.

When a size of a block is equal to or smaller than a particular size or area, the image decoding apparatus 100 may determine to not allow splitting of the block. For example, when the size of the current block is 8×8, the image decoding apparatus 100 may determine to not allow splitting of the current block. Also, for example, when the area of the current block is 64, the image decoding apparatus 100 may determine to not allow splitting of the current block.

In an inter slice or picture, a probability that a block is to be split may be smaller than a probability that the block is to be skipped, and thus the image decoding apparatus 100 may perform operations below.

The image decoding apparatus 100 may first obtain split information of the current block from a bitstream, before split information of the current block.

The image decoding apparatus 100 may obtain flag information indicating whether a largest coding unit has residual information at a largest coding unit level, and when a value of the flag information indicates that the largest coding unit does not have the residual information, the image decoding apparatus 100 may not parse, from a bitstream, syntax elements related to residual, and may determine to skip a decoding process related thereto.

Also, in an inter slice or picture, the image decoding apparatus 100 may determine to not allow asymmetrical binary split.

When the current block is located at a boundary of a picture, the image decoding apparatus 100 may split the current block without separately obtaining information from a bitstream. For example, when the current block is located at the boundary of the picture, the image decoding apparatus 100 may quad split the current block without separately obtaining information from the bitstream. In this regard, the current block may be recursively quad split until split blocks are not located at the boundary. However, in a case where a predetermined split depth is present, a block may be split to the depth.

When the current block is located at the boundary of the picture, the image decoding apparatus 100 may split the current block without separately obtaining information from the bitstream, and in this regard, the image decoding apparatus 100 may split the current block based on various split types and split directions. In this regard, the image decoding apparatus 100 may determine a split type and a split direction of the current block, based on a boundary condition of a block. In this regard, the current block may be recursively quad split until split blocks are not located at the boundary. However, in a case where a predetermined split depth is present, a block may be split to the depth.

For example, when the current block is located at a bottom boundary of a picture, the image decoding apparatus 100 may determine the split direction of the current block to be a horizontal direction, may determine the split type to be binary split (or tri split), and may binary split (tri split) the current block in the horizontal direction, based on the split direction and the split type of the current block.

When the current block is located at a right boundary of the picture, the image decoding apparatus 100 may determine the split direction of the current block to be a vertical direction, may determine the split type to be binary split (or tri split), and may binary split (tri split) the current block in the vertical direction, based on the split direction and the split type of the current block.

When the current block is located at a lower-right boundary of the picture, the image decoding apparatus 100 may determine the split type of the current block to be quad split, and may quad split the current block, based on the split type of the current block.

Because split types or split directions which are allowable for a block become various, complexity is geometrically increased. In order to decrease the complexity, the image decoding apparatus 100 may restrict some split types or split directions from among the various split types or split directions.

For example, the image decoding apparatus 100 may restrict a split depth of binary split. The image decoding apparatus 100 may restrict an allowable ratio of the block or an allowable size of the block.

The image decoding apparatus 100 may split the block by using only a split shape mode that satisfies the restriction condition, without separately obtaining information from a bitstream.

When the current block is located at a boundary of the picture, the image decoding apparatus 100 may allow only some split types from among the various split types of the block. For example, when the current block is located at the boundary of the picture, the image decoding apparatus 100 may allow only quad split from among the various split types.

In a case where a particular split shape mode being usable in the current block does not exist, the image decoding apparatus 100 may implicitly split the current block until split blocks have a particular split shape mode being usable in the block.

When the current block located at the boundary of the picture does not have residual, the image decoding apparatus 100 may determine to not further split the current block. In order to enable the determination, the image decoding apparatus 100 may perform operations below.

When the current block is located at the boundary of the picture, the image decoding apparatus 100 may obtain, from a bitstream, a flag indicating whether implicit split with respect to the current block is allowed. When a value of the flag is equal to 0, the image decoding apparatus 100 may determine that implicit split with respect to the current block is not allowed. In this case, the image decoding apparatus 100 may obtain information about a split shape mode of the current block from a bitstream, and may determine the split shape mode of the current block, based on the obtained information. When a value of the flag is equal to 1, the image decoding apparatus 100 may determine that implicit split with respect to the current block is allowed. In this case, the image decoding apparatus 100 may perform implicit split on the current block.

When the current block is located at the boundary of the picture, the image decoding apparatus 100 may obtain, from a bitstream, a flag indicating that the current block does not have residual. When a value of the flag is equal to 0, the image decoding apparatus 100 may perform implicit split on the current block. When a value of the flag is equal to 1, the image decoding apparatus 100 may determine to perform a skip mode decoding process on the current block.

When a current largest coding unit is located at the boundary of the picture, the image decoding apparatus 100 may obtain a flag of a largest coding unit level from a bitstream, the flag indicating whether implicit split is allowed for a largest coding unit.

When a value of the flag is 0, the image decoding apparatus 100 may determine to not allow implicit split for the largest coding unit.

When a value of the flag is 1, the image decoding apparatus 100 may determine to allow implicit split for the largest coding unit, and may perform an implicit split process on the largest coding unit.

When the current largest coding unit is located at the boundary of the picture, the image decoding apparatus 100 may obtain, from a bitstream, a flag indicating that the current largest coding unit does not have residual. When a value of the flag is equal to 0, the image decoding apparatus 100 may perform implicit split on the current largest coding unit. When a value of the flag is equal to 1, the image decoding apparatus 100 may determine to perform a skip mode decoding process on the current largest coding unit.

When the current block is located at the boundary of the picture, the image decoding apparatus 100 may implicitly determine a split shape mode of the current block. For example, the image decoding apparatus 100 may determine one split shape mode from among a plurality of particular split shape modes, based on a boundary condition. When the current block is located at a right boundary of the picture, the image decoding apparatus 100 may obtain, from a bitstream, a flag indicating one split type from among binary split and quad split.

When the current largest coding unit is located at the boundary of the picture, the image decoding apparatus 100 may obtain, from a bitstream, split shape mode information to be used for the current largest coding unit.

When the current block is located at the boundary of the picture, the image decoding apparatus 100 may determine a split shape mode of the current block, based on a ratio of an area in the picture. For example, the image decoding apparatus 100 may determine a split shape mode of the current block, based on a ratio of a height and a width of a block area in the picture. When the current block is located at a left boundary or a right boundary, and a ratio of a width and a height of the current block is greater than N, the image decoding apparatus 100 may determine a split type of the current block to be quad split. If it is not so, the image decoding apparatus 100 may determine the split type of the current block to be binary split.

When the ratio of the width and the height of the current block is not equal to an integer value, the image decoding apparatus 100 may determine the split type of the current block to be quad split or may determine the split type of the current block to be binary split.

Alternatively, regardless of whether the current block is located at the boundary of the picture, the image decoding apparatus 100 may always obtain the split shape mode information about the current block from a bitstream. When the current block is located at the boundary of the picture, the image decoding apparatus 100 may determine to perform entropy decoding by allocating context-adaptive binary arithmetic coding (CABAC) context different from context of blocks that are not located at the boundary of the picture. The image decoding apparatus 100 may determine to perform entropy decoding by using CABAC context based on a boundary condition.

Figure 1B:
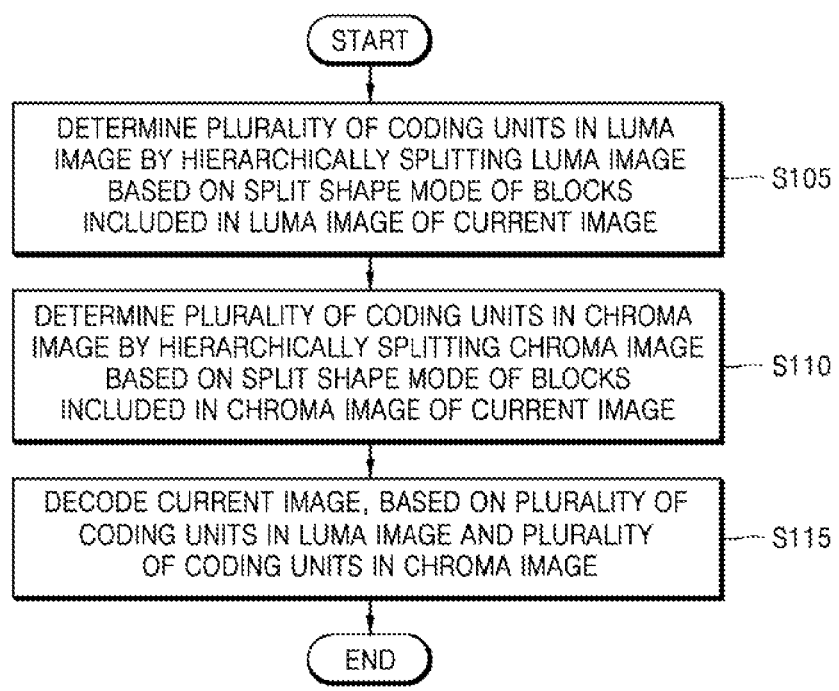
FIG. 1B is a flowchart of an image decoding method, according to various embodiments.

FIG. 1B is a flowchart of an image decoding method, according to various embodiments.

In operation S105, the image decoding apparatus 100 may determine a plurality of coding units in a luma image by hierarchically splitting the luma image, based on a split shape mode of blocks included in the luma image of a current image. The split shape mode may be a mode based on at least one of a split direction and a split type. The split type may indicate at least one of binary split, tri split, and quad split.

In operation S110, the image decoding apparatus 100 may determine a plurality of coding units in a chroma image by hierarchically splitting the chroma image, based on a split shape mode of blocks included in the chroma image of the current image. When a size or area of a chroma block is equal to or smaller than a preset size or area, wherein the chroma block is from among a plurality of chroma blocks that may be generated by splitting a current chroma block in the chroma image based on a split shape mode of the current chroma block in the chroma image, the image decoding apparatus 100 may not allow splitting of the current chroma block based on a split shape mode of the current chroma block and may determine at least one coding unit included in the current chroma block.

In operation S115, the image decoding apparatus 100 may decode the current image, based on the plurality of coding units in the luma image and the plurality of coding units in the chroma image.

Figure 1C:
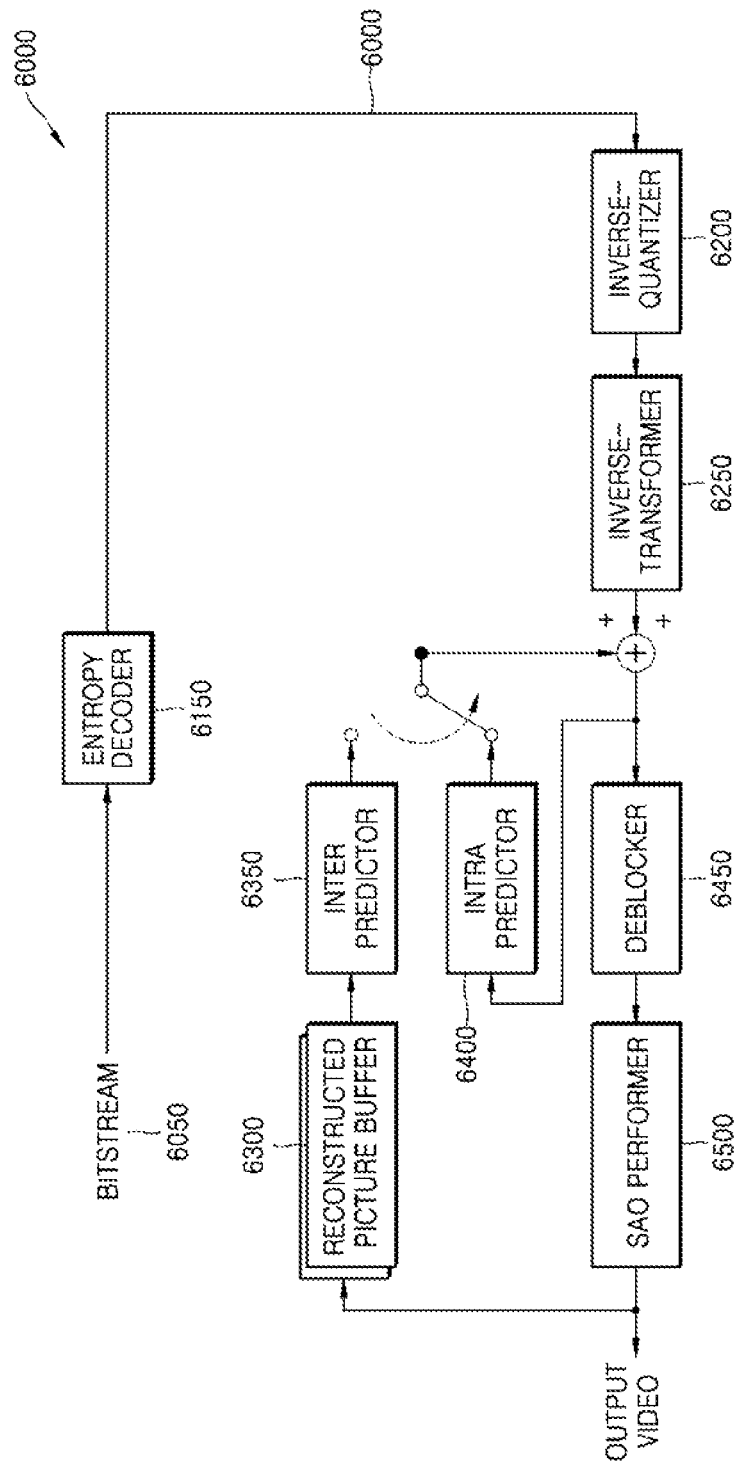
FIG. 1C is a block diagram of an image decoder according to various embodiments.

FIG. 1C is a block diagram of an image decoder 6000 according to various embodiments.

The image decoder 6000 according to various embodiments performs operations necessary for the image decoder 110 of the image decoding apparatus 100 to decode image data.

Referring to FIG. 1C, an entropy decoder 6150 parses, from a bitstream 6050, encoded image data to be decoded, and encoding information necessary for decoding. The encoded image data is a quantized transform coefficient, and a de-quantizer 6200 and an inverse-transformer 6250 reconstruct residue data from the quantized transform coefficient.

An intra predictor 6400 performs intra prediction on each of blocks. An inter predictor 6350 performs inter prediction on each block by using a reference image obtained from a reconstructed picture buffer 6300. Data of a spatial domain for a block of a current image 6050 may be reconstructed by adding residual data and prediction data of each block which are generated by the intra predictor 6400 or the inter predictor 6350, and a deblocker 6450 and a sample adaptive offset (SAO) performer 6500 may perform loop filtering on the reconstructed data of the spatial domain, such that a filtered reconstructed image may be output. Reconstructed images stored in the reconstructed picture buffer 6300 may be output as a reference image.

In order for the image decoding apparatus 100 to encode the image data, the image decoder 6000 according to various embodiments may perform operations of each stage on each block.

Figure 2A:
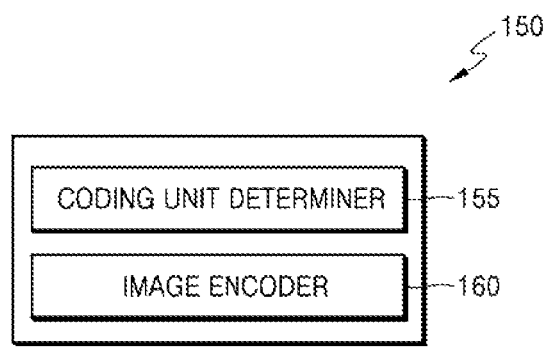
FIG. 2A is a block diagram of an image encoding apparatus, according to various embodiments.

FIG. 2A is a block diagram of an image encoding apparatus, according to various embodiments.

An image encoding apparatus 150 according to various embodiments may include a coding unit determiner 155 and an image encoder 160.

The coding unit determiner 155 and the image encoder 160 may include at least one processor. Also, the coding unit determiner 155 and the image encoder 160 may include a memory storing instructions to be performed by the at least one processor. The image encoder 160 and the coding unit determiner 155 may be implemented as separate hardware components, or the image encoder 160 may include the coding unit determiner 155.

The coding unit determiner 155 may determine a plurality of coding units in a luma image by hierarchically splitting the luma image based on a split shape mode of blocks included in the luma image of a current image.

The coding unit determiner 155 may determine a plurality of coding units in a chroma image by hierarchically splitting the chroma image based on a split shape mode of blocks included in the chroma image of the current image. The coding unit determiner 155 may determine whether a size or area of a chroma block is equal to or smaller than a preset size or area, wherein the chroma block is from among a plurality of chroma blocks that may be generated by splitting a current chroma block in the chroma image based on a split shape mode of the current chroma block in the chroma image. Based on a result of the determination, the coding unit determiner 155 may determine to not allow splitting of the current chroma block based on the split shape mode of the current chroma block.

The coding unit determiner 155 may determine at least one coding unit included in the current chroma block, based on one split shape mode from among split shape modes of the current block which are allowed except for the split shape mode that is determined to not be allowed. When an allowed split shape mode of the current block does not exist, the coding unit determiner 155 may no longer perform splitting and may determine the current chroma block to be a coding unit.

When the coding unit determiner 155 determines that the size or area of the chroma block is equal to or smaller than the preset size or area, wherein the chroma block is from among the plurality of chroma blocks that may be generated by splitting the current chroma block in the chroma image based on the split shape mode of the current chroma block in the chroma image, the coding unit determiner 155 may determine to not allow splitting of the current chroma block based on the split shape mode of the current chroma block. In this regard, the preset size may be one of 4×2, 2×4, and 2×2. Also, the preset area may be one of 8 and 4.

According to whether a condition based on a size or area of the current chroma block and the split shape mode of the current chroma block is satisfied, the coding unit determiner 155 may determine whether the size or area of the chroma block is equal to or smaller than the preset size or area, wherein the chroma block is from among the plurality of chroma blocks that may be generated by splitting the current chroma block in the chroma image based on the split shape mode of the current chroma block in the chroma image. In this regard, the condition based on the size or area of the current chroma block and the split shape modes of the current block may refer to a condition about whether a width or height of the current chroma block is equal to or smaller than 4 when a split type of the current chroma block indicates quad split. When the split type of the current chroma block indicates quad split and the size or width of the current chroma block is equal to or smaller than 4, the coding unit determiner 155 may determine to not allow splitting based on quad split. That is, a height or width of a chroma block from among a plurality of chroma blocks generated by quad splitting the current chroma block when the height or width of the current chroma block is equal to or smaller than 4 may be equal to or smaller than 2. Therefore, a size of the chroma block from among the plurality of chroma blocks generated by quad splitting the current chroma block may be 2×2, 4×2, or 2×4 (or a smaller size), and when the size of such block is allowed as a coding unit and the block is encoded, a throughput may be decreased such that, in order to increase the throughput, quad split of the current block may be determined to not be allowed. The coding unit determiner 155 may split the current chroma block based another allowed split type except for quad split. When an allowed split type for the current chroma block does not exist, the coding unit determiner 155 may no longer perform splitting and may determine the current chroma block to be a coding unit.

The condition based on the size or area of the current chroma block and the split shape modes of the current block may refer to a condition about whether an area of the current chroma block is equal to or smaller than 16 when a split type of the current chroma block indicates binary split. When the split type of the current chroma block indicates binary split and the area of the current chroma block is equal to or smaller than 16, the coding unit determiner 155 may determine to not allow splitting based on binary split. That is, a size of a chroma block from among a plurality of chroma blocks generated by binary splitting the current chroma block when the area of the current chroma block is equal to or smaller than 16 (e.g., when a size of the current chroma block is equal to or smaller than 2×8, 8×2, or 4×4) may be equal to or smaller than 2×4, or 4×2. When the size of such block is allowed as a coding unit and the block is encoded or decoded, a throughput may be decreased such that, in order to increase the throughput, binary split of the current block may be determined to not be allowed. The coding unit determiner 155 may split the current chroma block based on another allowed split type except for binary split. When an allowed split type for the current chroma block does not exist, the coding unit determiner 155 may no longer perform splitting and may determine the current chroma block to be a coding unit.

The condition based on the size or area of the current chroma block and the split shape modes of the current block may refer to a condition about whether an area of the current chroma block is equal to or smaller than 32 when a split type of the current chroma block indicates tri split. When the split type of the current chroma block indicates tri split and the area of the current chroma block is equal to or smaller than 32, the coding unit determiner 155 may determine to not allow splitting based on tri split. That is, a size of a chroma block from among a plurality of chroma blocks generated by tri splitting the current chroma block when the area of the current chroma block is equal to or smaller than 32 (e.g., when a size of the current chroma block is equal to or smaller than 4×8, 8×4, 2×16, or 16×2) may be equal to or smaller than 2×4, or 4×2. When the size of such block is allowed as a coding unit and the block is encoded or decoded, a throughput may be decreased such that, in order to increase the throughput, tri split of the current block may be determined to not be allowed. The coding unit determiner 155 may split the current chroma block based on another allowed split type except for tri split. When an allowed split type for the current chroma block does not exist, the coding unit determiner 155 may no longer perform splitting and may determine the current chroma block to be a coding unit.

A split shape mode of blocks in a chroma image of a current image may be independent from a split shape mode of blocks included in a luma image of the current image, but the disclosure is not limited thereto, and thus, the split shape mode of the blocks in the chroma image of the current image may be dependent on a split shape mode of corresponding blocks included in a luma image of the current image which correspond to the blocks in the chroma image.

That is, the coding unit determiner 155 may determine a plurality of coding units in the luma image by hierarchically splitting the luma image based on the split shape mode of the blocks included in the luma image of the current image, and may determine a plurality of coding units in the chroma image by hierarchically splitting the chroma image, based on a split shape mode of blocks included in the chroma image which is equal to the split shape mode of the blocks included in the luma image. In this regard, the coding unit determiner 155 may determine a size of a block in the chroma image, based on a chroma sub sampling scheme of the current block and a size of a corresponding block of the luma image. For example, when the chroma sub sampling scheme refers to YUV 4:2:0, and the size of the corresponding block of the luma image refers to 16×16, the size of the block in the chroma image may be determined to be 8×8.

When a size of a block is equal to or smaller than 2×N (where N is an integer equal to or greater than 2) or N×2, wherein the block is from among a plurality of blocks split from the current chroma block in the chroma image based on the split shape mode of the current chroma block in the chroma image, the coding unit determiner 155 may determine to not allow splitting of the current chroma block based on the split shape mode of the current chroma block. The coding unit determiner 155 may determine at least one coding unit included in the current chroma block based on allowable split types excluding the disallowed split type.

The image encoder 160 may encode the current image, based on the plurality of coding units in the luma image and the plurality of coding units in the chroma image.

Each of luma blocks split from each inter slice or picture may have a different prediction mode. For example, each luma block may have an inter or intra prediction mode. In this case, the image encoding apparatus 150 may determine a prediction mode of a corresponding chroma block to be as below. When a current slice or picture is an inter slice or picture, and a ratio of an area of a luma block having an intra prediction mode to an area of a luma block is equal to or greater than a preset value, the image encoding apparatus 150 may determine a prediction mode of a chroma block to be an intra prediction mode.

When a current slice or picture is an inter slice or picture, and a ratio of an area of a luma block having an inter prediction mode to an area of a luma block is greater than a preset value, the image encoding apparatus 150 may determine a prediction mode of a chroma block to be an inter prediction mode.

When a luma block having a particular size is split, the image encoding apparatus 150 may encode information about a prediction mode of a corresponding chroma block, and may generate a bitstream including the encoded information about the prediction mode of the chroma block.

The image encoding apparatus 150 may determine a prediction mode of a luma block to be a prediction mode of a chroma block, the luma block corresponding to a particular location of the chroma block. For example, the particular location may be an upper-left location, a center location, a lower-left location, a top location, a lower-right location, and the like. In this regard, the particular location may be a predefined location, but the disclosure is not limited thereto, and the image encoding apparatus 150 may encode information about the particular location, and may generate a bitstream including the encoded information about the particular location.

In order to improve a throughput, the image encoding apparatus 150 may perform operations below when a size of a current block is equal to or smaller than a particular size or an area of the current block is equal to or smaller than a particular value.

The image encoding apparatus 150 may transform the current block by using a transformation method other than a transformation method such as a DCT. For example, when the size of the current block is smaller than 4×4, the image encoding apparatus 150 may transform the current block by using the Hadamard transform.

The image encoding apparatus 150 may determine to skip transformation of the current block. For example, the image encoding apparatus 150 may encode a transform skip flag and may generate a bitstream including the encoded flag. However, when the size of the current block is equal to or smaller than a particular size or the area of the current block is equal to or smaller than a particular value, the image encoding apparatus 150 may determine to skip transformation of the current block and may not encode the transform skip flag about the current block.

When a size of a block is equal to or smaller than a particular size or area, the image encoding apparatus 150 may determine to not allow splitting of the block. For example, when the size of the current block is 8×8, the image encoding apparatus 150 may determine to not allow splitting of the current block. Also, for example, when the area of the current block is 64, the image encoding apparatus 150 may determine to not allow splitting of the current block.

When a current slice or picture is an inter slice or picture, a probability that a block is to be split may be less than a probability that the block is to be skipped, and thus, the image encoding apparatus 150 may perform operations below.

The image encoding apparatus 150 may first encode split information of the current block before split information of the current block.

When the image encoding apparatus 150 determines that a largest coding unit does not have residual information, the image encoding apparatus 150 may determine to not encode syntax elements related to residual, may encode a flag indicating that the largest coding unit does not have the residual information, and may generate a bitstream including the encoded flag.

When a current slice or picture is an inter slice or picture, the image encoding apparatus 150 may determine to not allow asymmetrical binary split.

When the current block is located at a boundary of a picture, the image encoding apparatus 150 may split the current block. In this regard, the image encoding apparatus 150 may not encode split shape mode information about the current block.

For example, when the current block is located at the boundary of the picture, the image encoding apparatus 150 may quad split the current block without separately encoding split shape mode information. In this regard, the current block may be recursively quad split until split blocks are not located at the boundary. However, in a case where a predetermined split depth is present, a block may be split to the depth.

When the current block is located at the boundary of the picture, the image encoding apparatus 150 may split the current block without separately encoding split shape mode information about the current block, and in this regard, the image encoding apparatus 150 may split the current block based on various split types and split directions. In this regard, the image encoding apparatus 150 may determine a split type and a split direction of the current block, based on a boundary condition of a block. In this regard, the current block may be recursively quad split until split blocks are not located at the boundary. However, in a case where a predetermined split depth is present, a block may be split to the depth.

For example, when the current block is located at a bottom boundary of a picture, the image encoding apparatus 150 may determine the split direction of the current block to be a horizontal direction, may determine the split type to be binary split, and may binary split the current block in the horizontal direction, based on the split direction and the split type of the current block.

When the current block is located at a right boundary of the picture, the image encoding apparatus 150 may determine the split direction of the current block to be a vertical direction, may determine the split type to be binary split, and may binary split the current block in the vertical direction, based on the split direction and the split type of the current block.

When the current block is located at a lower-right boundary of the picture, the image encoding apparatus 150 may determine the split type of the current block to be quad split, and may quad split the current block, based on the split type of the current block.

Because split types or split directions which are allowable for a block become various, complexity is geometrically increased. In order to decrease the complexity, the image encoding apparatus 150 may restrict some split types or split directions from among the various split types or split directions.

For example, the image encoding apparatus 150 may restrict a split depth of binary split. The image encoding apparatus 150 may restrict an allowable ratio of the block or an allowable size of the block.

The image encoding apparatus 150 may split the block by using only a split shape mode that satisfies the restriction condition, and may not separately encode split shape mode information.

When the current block is located at a boundary of the picture, the image encoding apparatus 150 may allow only some split types from among the various split types of the block. For example, when the current block is located at the boundary of the picture, the image encoding apparatus 150 may allow only quad split from among the various split types.

In a case where a particular split shape mode being usable in the current block does not exist, the image encoding apparatus 150 may implicitly split the current block until split blocks have a particular split shape mode being usable in the block.

When the current block located at the boundary of the picture does not have residual, the image encoding apparatus 150 may determine to not further split the current block. In order to enable the determination, the image encoding apparatus 150 may perform operations below.

When the current block is located at the boundary of the picture, the image encoding apparatus 150 may encode a flag indicating whether implicit split with respect to the current block is allowed. When the image encoding apparatus 150 determines to not allow implicit split with respect to the current block, the image encoding apparatus 150 may encode a value of the flag as 0. In this case, the image encoding apparatus 150 may encode split shape mode information about the current block, and may generate a bitstream including the encoded split shape mode information about the current block.

When the image encoding apparatus 150 determines to allow implicit split with respect to the current block, the image encoding apparatus 150 may encode a value of the flag as 1.

When the current block is located at the boundary of the picture, the image encoding apparatus 150 may encode a flag indicating that the current block does not have residual, and may generate a bitstream including the encoded flag.

When the image encoding apparatus 150 performs implicit split on the current block, the image encoding apparatus 150 may encode a value of the flag as 0. When the image encoding apparatus 150 performs a skip mode encoding process on the current block, the image encoding apparatus 150 may encode a value of the flag as 1.

When a current largest coding unit is located at the boundary of the picture, the image encoding apparatus 150 may encode a flag of a largest coding unit level, the flag indicating whether implicit split is allowed for a largest coding unit.

When the image encoding apparatus 150 determines to not allow implicit split with respect to the largest coding unit, the image encoding apparatus 150 may encode a value of the flag as 0.

When the image encoding apparatus 150 performs an implicit split process on the largest coding unit, the image encoding apparatus 150 may encode a value of the flag as 1.

When the current largest coding unit is located at the boundary of the picture, the image encoding apparatus 150 may encode a flag indicating that the current largest coding unit does not have residual. When the image encoding apparatus 150 performs implicit split on the current largest coding unit, the image encoding apparatus 150 may encode a value of the flag to be equal to 0. When the image encoding apparatus 150 determines to perform a skip mode encoding process on the current largest coding unit, the image encoding apparatus 150 may encode a value of the flag to be equal to 1.

When the current block is located at the boundary of the picture, the image encoding apparatus 150 may implicitly determine a split shape mode of the current block. For example, the image encoding apparatus 150 may determine one split shape mode from among a plurality of particular split shape modes, based on a boundary condition. When the current block is located at a right boundary of the picture, the image encoding apparatus 150 may encode a flag indicating one split type from among binary split and quad split.

When the current largest coding unit is located at the boundary of the picture, the image encoding apparatus 150 may encode split shape mode information to be used for the current largest coding unit, and may generate a bitstream including the encoded split shape mode information.

When the current block is located at the boundary of the picture, the image encoding apparatus 150 may determine a split shape mode of the current block, based on a ratio of an area in the picture. For example, the image encoding apparatus 150 may determine a split shape mode of the current block, based on a ratio of a height and a width of a block area in the picture. When the current block is located at a left boundary or a right boundary, and a ratio of a width and a height of the current block is greater than N, the image encoding apparatus 150 may determine a split type of the current block to be quad split. If it is not so, the image encoding apparatus 150 may determine the split type of the current block to be binary split.

When the ratio of the width and the height of the current block is not equal to an integer value, the image encoding apparatus 150 may determine the split type of the current block to be quad split or may determine the split type of the current block to be binary split.

Alternatively, regardless of whether the current block is located at the boundary of the picture, the image encoding apparatus 150 may encode the split shape mode information about the current block.

When the current block is located at the boundary of the picture, the image encoding apparatus 150 may entropy encode the current block by allocating CABAC context different from context of blocks that are not located at the boundary of the picture. The image encoding apparatus 150 may perform entropy encoding by using CABAC context based on a boundary condition.

Figure 2B:
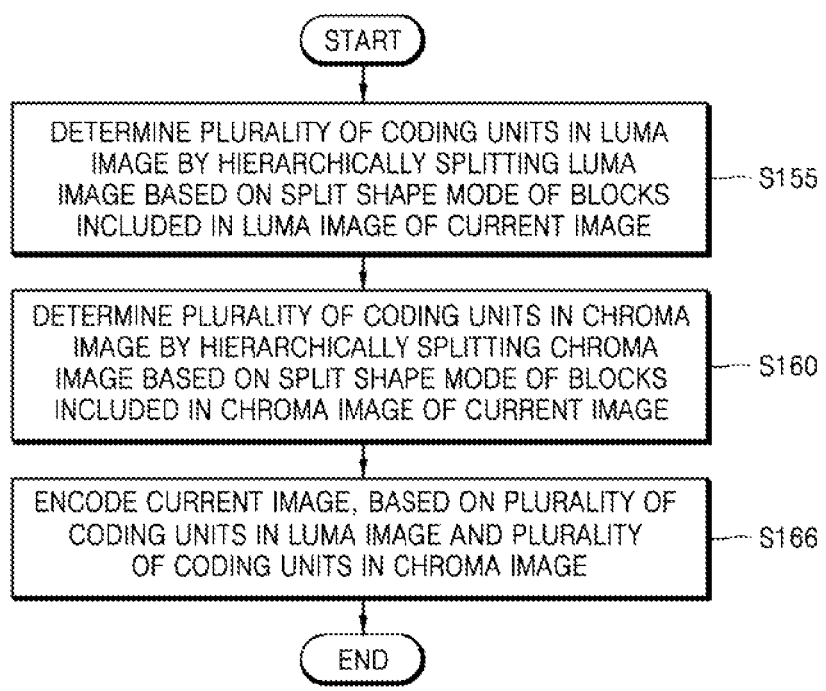
FIG. 2B illustrates a flowchart of an image encoding method according to various embodiments.

FIG. 2B illustrates a flowchart of an image encoding method according to various embodiments.

In operation S155, the image encoding apparatus 150 may determine a plurality of coding units in a luma image by hierarchically splitting the luma image, based on a split shape mode of blocks included in the luma image of a current image.

In operation S160, the image encoding apparatus 150 may determine a plurality of coding units in a chroma image by hierarchically splitting the chroma image, based on a split shape mode of blocks included in the chroma image of the current image. When a size or area of a chroma block is equal to or smaller than a preset size or area, wherein the chroma block is from among a plurality of chroma blocks that may be generated by splitting a current chroma block in the chroma image based on a split shape mode of the current chroma block in the chroma image, the image encoding apparatus 150 may not allow splitting of the current chroma block based on a split shape mode of the current chroma block and may determine at least one coding unit included in the current chroma block.

In operation S165, the image encoding apparatus 150 may encode the current image, based on the plurality of coding units in the luma image and the plurality of coding units in the chroma image.

Figure 2C:
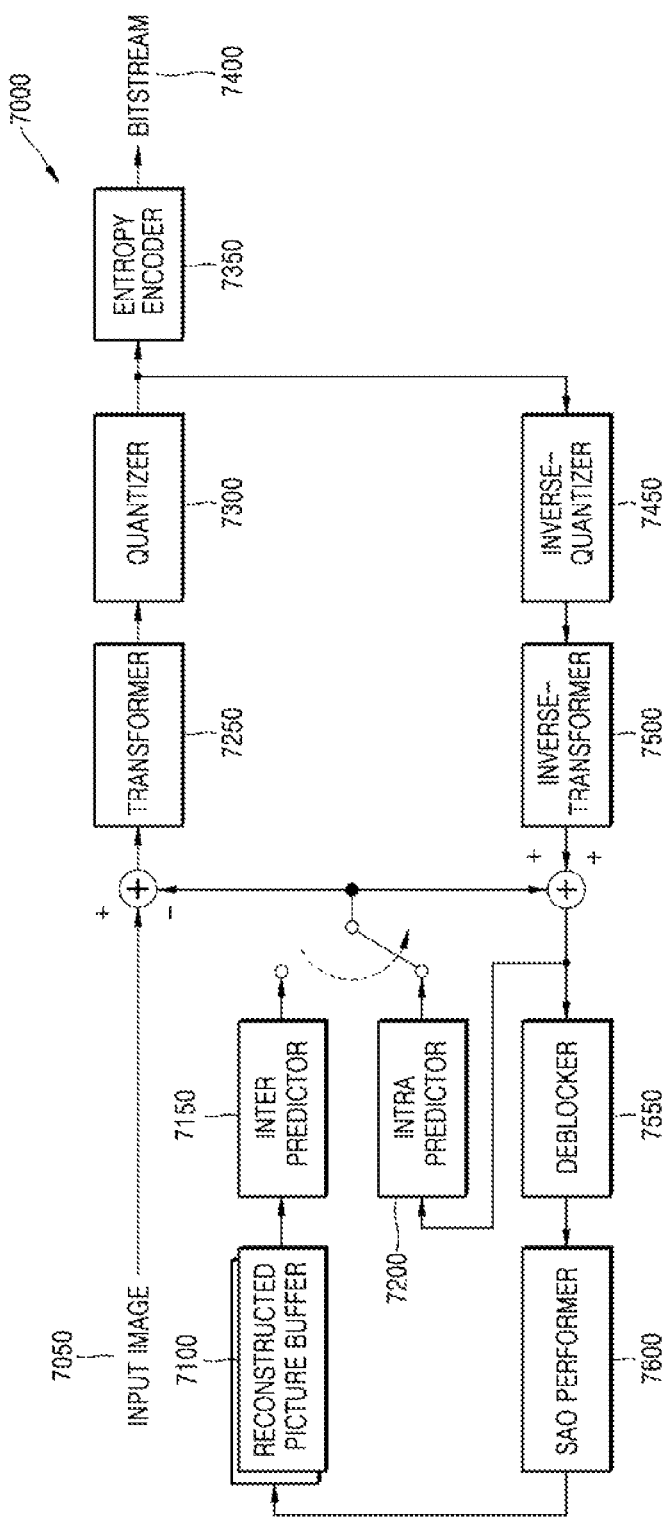
FIG. 2C is a block diagram of an image encoder according to various embodiments.

FIG. 2C is a block diagram of an image encoder according to various embodiments.

An image encoder 7000 according to various embodiments performs operations necessary for the image encoder 160 of the image encoding apparatus 150 to encode image data.

That is, an intra predictor 7200 performs intra prediction on each of blocks of a current image 7050, and an inter predictor 7150 performs inter prediction on each of the blocks by using the current image 7050 and a reference image obtained from a reconstructed picture buffer 7100.

Prediction data is subtracted from data of a block to be encoded in the current image 7050, wherein the prediction data is related to each block and is output from the intra predictor 7200 or the inter predictor 7150, and the transformer 7250 and the quantizer 7300 may output a quantized transform coefficient of each block by performing transformation and quantization on the residue data. A de-quantizer 7450 and an inverse-transformer 7500 may reconstruct residue data of a spatial domain by performing de-quantization and inverse transformation on the quantized transform coefficient. The reconstructed residue data of the spatial domain may be added to the prediction data that is related to each block and is output from the intra predictor 7200 or the inter predictor 7150, and thus may be reconstructed as data of a spatial domain with respect to a block of the current image 7050. A deblocker 7550 and a SAO performer 7600 generate a filtered reconstructed image by performing inloop filtering on the reconstructed data of the spatial domain. The generated reconstructed image is stored in the reconstructed picture buffer 7100. Reconstructed images stored in the reconstructed picture buffer 7100 may be used as a reference image for inter prediction with respect to another image. An entropy encoder 7350 may entropy encode the quantized transform coefficient, and the entropy encoded coefficient may be output as a bitstream 7400.

In order for the image encoder 7000 according to various embodiments to be applied to the image encoding apparatus 150, the image encoder 7000 according to various embodiments may perform operations of each stage on each block.

Hereinafter, splitting of a coding unit will be described in detail according to an embodiment of the disclosure.

An image may be split into largest coding units. A size of each largest coding unit may be determined based on information obtained from a bitstream. A shape of each largest coding unit may be a square shape of the same size. However, the disclosure is not limited thereto. Also, a largest coding unit may be hierarchically split into coding units based on split shape mode information obtained from the bitstream. The split shape mode information may include at least one of information indicating whether splitting is to be performed, split direction information, and split type information. The information indicating whether splitting is to be performed indicates whether a coding unit is to be split. The split direction information indicates that splitting is to be performed in one of a horizontal direction or a vertical direction. The split type information indicates that a coding unit is to be split by using one of binary split, tri split (also referred to as triple split), or quad split.

For convenience of description, in the disclosure, it is assumed that the split shape mode information includes the information indicating whether splitting is to be performed, the split direction information, and the split type information, but the disclosure is not limited thereto. The image decoding apparatus 100 may obtain, from a bitstream, the split shape mode information as one bin string. The image decoding apparatus 100 may determine whether to split a coding unit, a split direction, and a split type, based on the one bin string.

The coding unit may be equal to or smaller than a largest coding unit. For example, when the split shape mode information indicates that splitting is not to be performed, the coding unit has a same size as the largest coding unit. When the split shape mode information indicates that splitting is to be performed, the largest coding unit may be split into lower-depth coding units. When split shape mode information about the lower-depth coding units indicates splitting, the lower-depth coding units may be split into smaller coding units. However, the splitting of the image is not limited thereto, and the largest coding unit and the coding unit may not be distinguished. The splitting of the coding unit will be described in detail with reference to FIGS. 3 to 16.

Also, the coding unit may be split into prediction units for prediction of the image. The prediction units may each be equal to or smaller than the coding unit. Also, the coding unit may be split into transform units for transformation of the image. The transform units may each be equal to or smaller than the coding unit. Shapes and sizes of the transform unit and the prediction unit may not be related to each other. The coding unit may be distinguished from the prediction unit and the transform unit, or the coding unit, the prediction unit, and the transform unit may be equal to each other. Splitting of the prediction unit and the transform unit may be performed in a same manner as splitting of the coding unit. The splitting of the coding unit will be described in detail with reference to FIGS. 3 to 16. A current block and a neighboring block of the disclosure may indicate one of the largest coding unit, the coding unit, the prediction unit, and the transform unit. Also, the current block of the current coding unit is a block that is currently being decoded or encoded or a block that is currently being split. The neighboring block may be a block reconstructed prior to the current block. The neighboring block may be spatially or temporally adjacent to the current block. The neighboring block may be located at one of the lower-left, left, upper-left, top, upper-right, right, lower-right of the current block.

Figure 3:
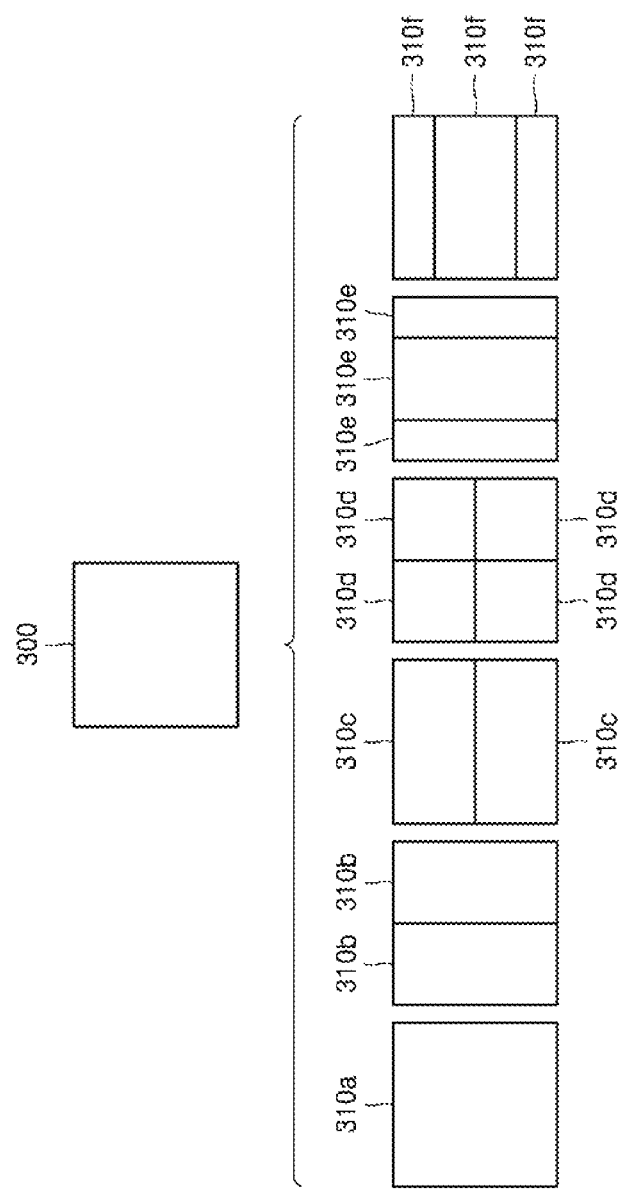
FIG. 3 illustrates a process, performed by the image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a ratio of a width and height, or sizes of the coding unit.

The shape of the coding unit may include a square and a non-square. When the lengths of the width and height of the coding unit are equal (i.e., when the block shape of the coding unit is 4N×4N), the image decoding apparatus 100 may determine the block shape information of the coding unit as a square. The image decoding apparatus 100 may determine the shape of the coding unit to be a non-square.

When the lengths of the width and the height of the coding unit are different from each other (i.e., when the block shape of the coding unit is 4N×4N, 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height in the block shape information of the coding unit to be at least one of 1:2, 2:1, 1:4, 4:1, 1:8, or 8:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 150 may obtain pre-agreed split shape mode information, based on the block shape information. The image decoding apparatus 100 may obtain the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which both the width and the height of the coding unit are bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, an image decoder 110 may not split a coding unit 310*a* having the same size as the current coding unit 300, based on the split shape mode information indicating not to perform splitting, or may determine coding units 310*b*, 310c, or 310d split based on the split shape mode information indicating a preset splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform tri (or ternary)-splitting in a vertical direction. The image decoding apparatus 100 may determine three coding units 310f obtained by splitting the current coding unit 300 in a horizontal direction, based on the split shape mode information indicating to perform ternary-splitting in a horizontal direction.

However, splitting methods of the square coding unit are not limited to the aforementioned methods, and may include various methods that may be indicated by the split shape mode information. Preset splitting methods of splitting the square coding unit will be described in detail below in relation to various embodiments.

Figure 4:
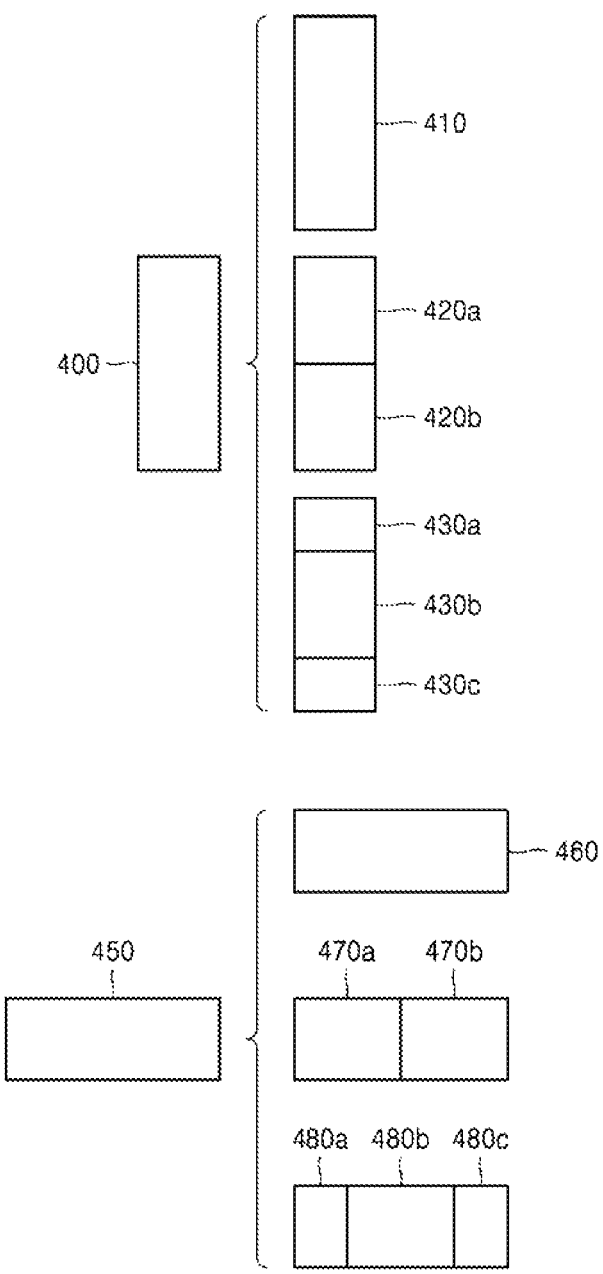
FIG. 4 illustrates a process, performed by the image decoding apparatus, of determining at least one coding unit by splitting a non-square coding unit, according to an embodiment.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a preset splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450, based on the split shape mode information indicating not to perform splitting, or may determine coding units 420a and 420b, 430a, 430b, and 430c, 470a and 470b, or 480a, 480b, and 480c which are split based on the split shape mode information indicating a preset splitting method. Preset splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may split a current coding unit, in consideration of the location of a long side of the non-square current coding unit 400 or 450. For example, the image decoding apparatus 100 may determine a plurality of coding units by splitting the current coding unit 400 or 450 by splitting a long side of the current coding unit 400 or 450, in consideration of the shape of the current coding unit 400 or 450.

According to an embodiment, when the split shape mode information indicates to split (tri-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a preset coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a preset restriction on at least one coding unit from among the odd number of coding units generated by splitting the current coding unit 400 or 450. Referring to FIG. 4, the image decoding apparatus 100 may allow a decoding process of the coding unit 430b or 480b to be different from that of the other coding units 430a and 430c, or 480a or 480c, wherein coding unit 430b or 480b is at a center location from among the three coding units 430a, 430b, and 430c or 480a, 480b, and 480c generated by splitting the current coding unit 400 or 450. For example, the image decoding apparatus 100 may restrict the coding unit 430b or 480b at the center location to be no longer split or to be split only a preset number of times, unlike the other coding units 430a and 430c, or 480a and 480c.

Figure 5:
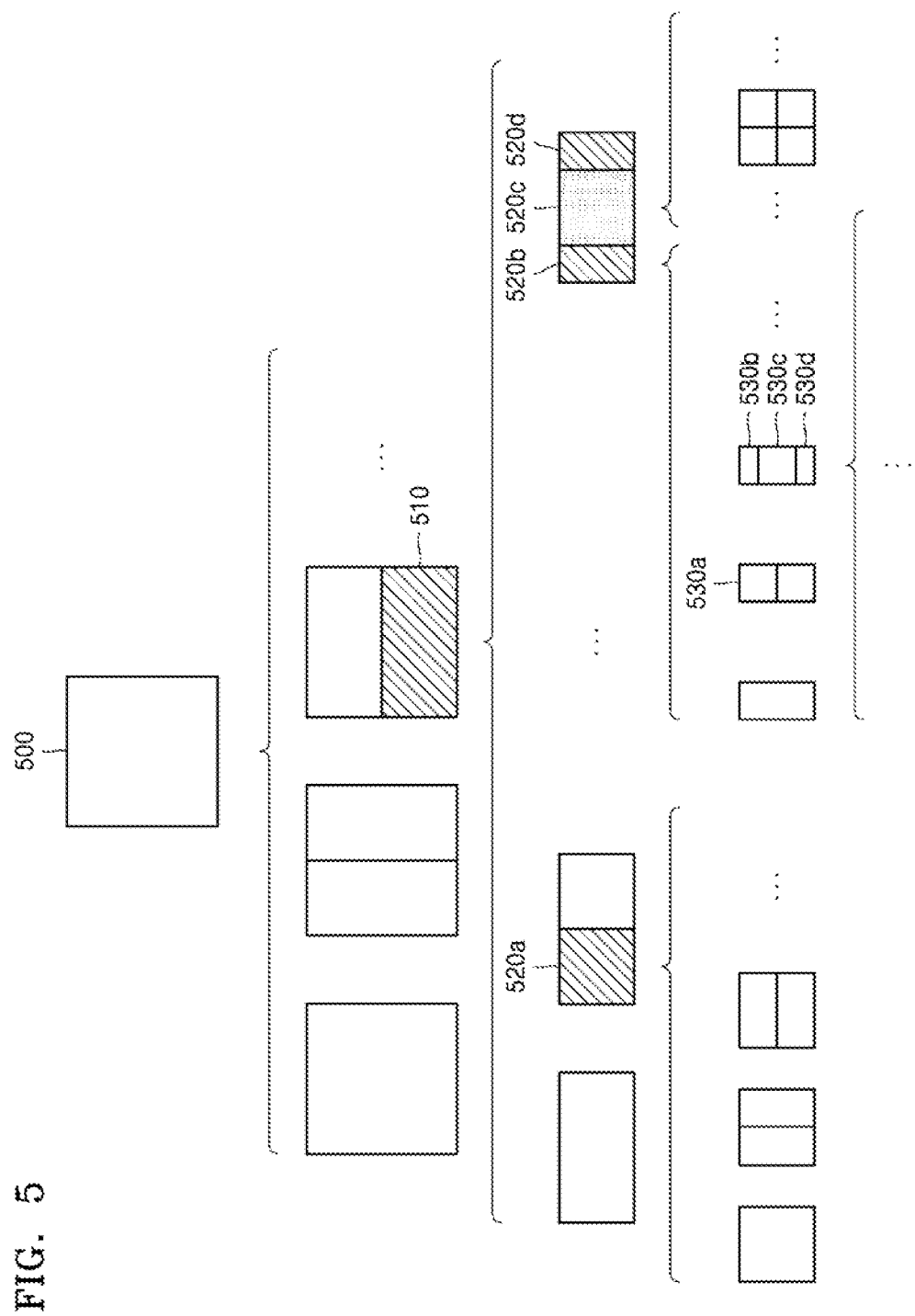
FIG. 5 illustrates a process, performed by the image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split a square first coding unit 500 into coding units, based on at least one of the block shape information and the split shape mode information, or may determine to not split the square first coding unit 500. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. It will be understood that the structure of the first coding unit, the second coding unit, and the third coding unit follows the above descriptions.

According to an embodiment, the image decoding apparatus 100 may determine to split the determined second coding unit 510 into coding units, based on at least one of the block shape information and the split shape mode information, or may determine to not split the determined second coding unit 510. Referring to FIG. 5, the image decoding apparatus 100 may split the non-square second coding unit 510, which is determined by splitting the first coding unit 500, into one or more third coding units 520a, or 520b, 520c, and 520d at least one of the block shape information and the split shape mode information, or may not split the non-square second coding unit 510. The image decoding apparatus 100 may obtain at least one of the block shape information and the split shape mode information, and may split a plurality of various-shaped second coding units (e.g., 510) by splitting the first coding unit 500, based on at least one of the obtained block shape information and the obtained split shape mode information, and the second coding unit 510 may be split by using a splitting method of the first coding unit 500 based on at least one of the block shape information and the split shape mode information. According to an embodiment, when the first coding unit 500 is split into the second coding units 510 based on at least one of block shape information and split shape mode information about the first coding unit 500, the second coding unit 510 may also be split into the third coding units 520a, or 520b, 520c, and 520d based on at least one of block shape information and split shape mode information about the second coding unit 510. That is, a coding unit may be recursively split based on at least one of block shape information and split shape mode information about each coding unit. Therefore, a square coding unit may be determined by splitting a non-square coding unit, and a non-square coding unit may be determined by recursively splitting the square coding unit.

Referring to FIG. 5, a preset coding unit (e.g., a coding unit located at a center location or a square coding unit) from among the odd number of third coding units 520b, 520c, and 520d determined by splitting the non-square second coding unit 510 may be recursively split. According to an embodiment, the non-square third coding unit 520b from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be re-split into a plurality of coding units. For example, the non-square fourth coding unit 530b or 530d may be re-split into the odd number of coding units. A method that may be used to recursively split a coding unit will be described below in relation to various embodiments.

According to an embodiment, the image decoding apparatus 100 may split each of the third coding units 520a, or 520b, 520c, and 520d into coding units, based on at least one of block shape information and split shape mode information. Also, the image decoding apparatus 100 may determine not to split the second coding unit 510 based on at least one of block shape information and split shape mode information. According to an embodiment, the image decoding apparatus 100 may split the non-square second coding unit 510 into the odd number of third coding units 520b, 520c, and 520d. The image decoding apparatus 100 may put a preset restriction on a preset third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a preset splitting method (e.g., split into only four coding units or split by using a splitting method of the second coding unit 510), or to be split only a preset number of times (e.g., split only n times (where n>0)). However, the restrictions on the third coding unit 520c at the center location are not limited to the aforementioned examples, and it should be interpreted that the restrictions may include various restrictions for decoding the third coding unit 520c at the center location differently from the other third coding units 520b and 520d.

According to an embodiment, the image decoding apparatus 100 may obtain at least one of block shape information and split shape mode information, which is used to split a current coding unit, from a preset location in the current coding unit.

Figure 6:
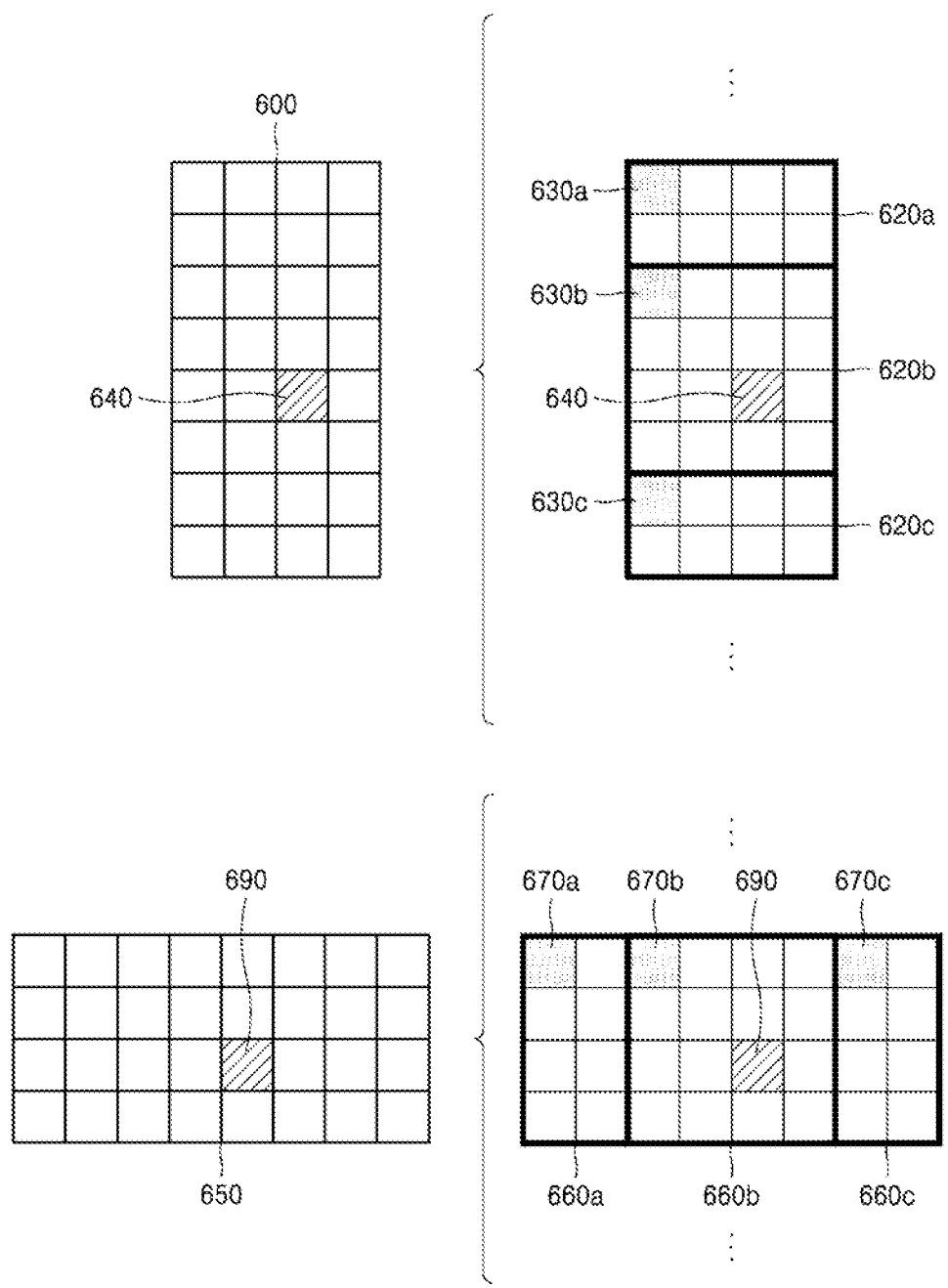
FIG. 6 illustrates a method, performed by the image decoding apparatus, of determining a preset coding unit from among an odd number of coding units, according to an embodiment.

FIG. 6 illustrates a method, performed by the image decoding apparatus 100, of determining a preset coding unit from among an odd number of coding units, according to an embodiment.

Referring to FIG. 6, at least one of block shape information and split shape mode information about a current coding unit 600 or 650 may be obtained from a sample of a preset location (e.g., a sample 640 or 690 of a center location) from among a plurality of samples included in the current coding unit 600 or 650. However, the preset location in the current coding unit 600, from which at least one of the block shape information and the split shape mode information may be obtained, is not limited to the center location in FIG. 6, and may include various locations included in the current coding unit 600 (e.g., top, bottom, left, right, upper-left, lower-left, upper-right, and lower-right locations). The image decoding apparatus 100 may obtain at least one of the block shape information and the split shape mode information from the preset location and may determine to split or not to split the current coding unit into various-shaped and various-sized coding units.

According to an embodiment, when the current coding unit is split into a preset number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a preset location.

According to an embodiment, the image decoding apparatus 100 may use information indicating locations of the odd number of coding units, so as to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of preset samples included in the coding units 620a, 620b, and 620c. In detail, the image decoding apparatus 100 may determine the coding unit 620b at the center location by determining the locations of the coding units 620a, 620b, and 620c based on information indicating locations of top-left samples 630a, 630b, and 630c of the coding units 620a, 620b, and 620c.

According to an embodiment, the information indicating the locations of the top-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the top-left sample 630a of the upper coding unit 620a may include coordinates (xa, ya), information indicating the location of the top-left sample 630b of the middle coding unit 620b may include coordinates (xb, yb), and information indicating the location of the top-left sample 630c of the lower coding unit 620c may include coordinates (xc, yc). The image decoding apparatus 100 may determine the middle coding unit 620b by using the coordinates of the top-left samples 630a, 630b, and 630c which are included in the coding units 620a, 620b, and 620c, respectively. For example, when the coordinates of the top-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the top-left samples 630a, 630b, and 630c may include coordinates indicating absolute locations in the picture, or may use coordinates (dxb, dyb) indicating a relative location of the top-left sample 630b of the middle coding unit 620b and coordinates (dxc, dyc) indicating a relative location of the top-left sample 630c of the lower coding unit 620c with reference to the location of the top-left sample 630a of the upper coding unit 620a. A method of determining a coding unit at a preset location by using coordinates of a sample included in the coding unit, as information indicating a location of the sample, is not limited to the aforementioned method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a preset criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the top-left sample 630a of the upper coding unit 620a, the coordinates (xb, yb) that is the information indicating the location of the top-left sample 630b of the middle coding unit 620b, and the coordinates (xc, yc) that is the information indicating the location of the top-left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a, 620b, and 620c. Referring to FIG. 6, the image decoding apparatus 100 may determine the middle coding unit 620b, which has a size different from the size of the upper and lower coding units 620a and 620c, as the coding unit of the preset location. However, the aforementioned method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

The image decoding apparatus 100 may determine the width or height of each of the coding units 660*a*, 660*b*, and 660*c* by using the coordinates (xd, yd) that is information indicating the location of a top-left sample 670*a* of the left coding unit 660*a*, the coordinates (xe, ye) that is information indicating the location of a top-left sample 670*b* of the middle coding unit 660*b*, and the coordinates (xf, yf) that is information indicating a location of the top-left sample 670*c* of the right coding unit 660*c*. The image decoding apparatus 100 may determine the respective sizes of the coding units 660*a*, 660*b*, and 660*c* by using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe-xd. The image decoding apparatus 100 may determine the height of the left coding unit 660*a* to be the height of the current coding unit 650. According to an embodiment, the image decoding apparatus 100 may determine the width of the middle coding unit 660*b* to be xf-xe. The image decoding apparatus 100 may determine the height of the middle coding unit 660*b* to be the height of the current coding unit 650. According to an embodiment, the image decoding apparatus 100 may determine the width or height of the right coding unit 660*c* by using the width or height of the current coding unit 650 or the widths or heights of the left and middle coding units 660*a* and 660*b*. The image decoding apparatus 100 may determine a coding unit, which has a size different from that of the others, based on the determined widths and heights of the coding units 660*a*, 660*b*, and 660*c*. Referring to FIG. 6, the image decoding apparatus 100 may determine the middle coding unit 660*b*, which has a size different from the sizes of the left and right coding units 660*a* and 660*c*, as the coding unit of the preset location. However, the aforementioned method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the aforementioned top-left locations, and information about arbitrary locations of samples included in the coding units may be used.

According to an embodiment, the image decoding apparatus 100 may select a coding unit at a preset location from among an odd number of coding units determined by splitting the current coding unit, in consideration of the shape of the current coding unit. For example, when the current coding unit has a non-square shape, a width of which is longer than its height, the image decoding apparatus 100 may determine the coding unit at the preset location in a horizontal direction. That is, the image decoding apparatus 100 may determine one of coding units at different locations in a horizontal direction and may put a restriction on the coding unit. When the current coding unit has a non-square shape, a height of which is longer than its width, the image decoding apparatus 100 may determine the coding unit at the preset location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, so as to determine the coding unit at the preset location from among the even number of coding units. The image decoding apparatus 100 may determine an even number of coding units by splitting (binary or bi splitting) the current coding unit, and may determine the coding unit at the preset location by using the information about the locations of the even number of coding units. An operation related thereto may correspond to the operation of determining a coding unit at a preset location (e.g., a center location) from among an odd number of coding units, which is described in detail above with reference to FIG. 6, and thus detailed descriptions thereof are not provided here.

According to an embodiment, when a non-square current coding unit is split into a plurality of coding units, preset information about a coding unit at a preset location may be used in a splitting process to determine the coding unit at the preset location from among the plurality of coding units. For example, the image decoding apparatus 100 may use at least one of block shape information and split shape mode information, which is stored in a sample included in a middle coding unit, in a splitting process to determine a coding unit at a center location from among the plurality of coding units determined by splitting the current coding unit.

Referring to FIG. 6, the image decoding apparatus 100 may split the current coding unit 600 into the plurality of coding units 620*a*, 620*b*, and 620*c* based on at least one of the block shape information and the split shape mode information, and may determine the coding unit 620*b* at a center location from among the plurality of the coding units 620*a*, 620*b*, and 620*c*. Furthermore, the image decoding apparatus 100 may determine the coding unit 620*b* at the center location, in consideration of a location from which based on at least one of the block shape information and the split shape mode information is obtained. That is, at least one of block shape information and split shape mode information about the current coding unit 600 may be obtained from the sample 640 at a center location of the current coding unit 600 and, when the current coding unit 600 is split into the plurality of coding units 620*a*, 620*b*, and 620*c* based on at least one of the block shape information and the split shape mode information, the coding unit 620*b* including the sample 640 may be determined as the coding unit at the center location. However, information used to determine the coding unit at the center location is not limited to at least one of block shape information and split shape mode information, and various types of information may be used to determine the coding unit at the center location.

According to an embodiment, preset information for identifying the coding unit at the preset location may be obtained from a preset sample included in a coding unit to be determined. Referring to FIG. 6, the image decoding apparatus 100 may use at least one of the block shape information and the split shape mode information, which is obtained from a sample at a preset location in the current coding unit 600 (e.g., a sample at a center location of the current coding unit 600), to determine a coding unit at a preset location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the preset location by considering a block shape of the current coding unit 600, may determine the coding unit 620*b* including a sample, from which preset information (e.g., at least one of the block shape information and the split shape mode information) is obtainable, from among the plurality of coding units 620*a*, 620*b*, and 620*c* determined by splitting the current coding unit 600, and may put a preset restriction on the coding unit 620*b*. Referring to FIG. 6, according to an embodiment, the image decoding apparatus 100 may determine the sample 640 at the center location of the current coding unit 600 as the sample from which the preset information is obtainable, and may put a preset restriction on the coding unit 620*b* including the sample 640, in a decoding operation. However, the location of the sample from which the preset information is obtainable is not limited to the aforementioned location, and may include arbitrary locations of samples included in the coding unit 620*b* to be determined for a restriction.

According to an embodiment, the location of the sample from which the preset information is obtainable may be determined based on the shape of the current coding unit 600. According to an embodiment, the block shape information may indicate whether the current coding unit has a square or non-square shape, and the location of the sample from which the preset information is obtainable may be determined based on the shape. For example, the image decoding apparatus 100 may determine a sample located on a boundary for splitting at least one of a width and height of the current coding unit in half, as the sample from which the preset information is obtainable, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the preset information is obtainable.

According to an embodiment, when the current coding unit is split into a plurality of coding units, the image decoding apparatus 100 may use at least one of the block shape information and the split shape mode information so as to determine a coding unit at a preset location from among the plurality of coding units. According to an embodiment, the image decoding apparatus 100 may obtain at least one of the block shape information and the split shape mode information from a sample at a preset location in a coding unit, and may split the plurality of coding units, which are generated by splitting the current coding unit, by using at least one of the block shape information and the split shape mode information, which is obtained from the sample of the preset location in each of the plurality of coding units. That is, a coding unit may be recursively split based on at least one of the block shape information and the split shape mode information, which is obtained from the sample at the preset location in each coding unit. An operation of recursively splitting a coding unit is described above with reference to FIG. 5, and thus detailed descriptions thereof are not provided here.

According to an embodiment, the image decoding apparatus 100 may determine one or more coding units by splitting the current coding unit, and may determine an order of decoding the one or more coding units, based on a preset block (e.g., the current coding unit).

Figure 7:
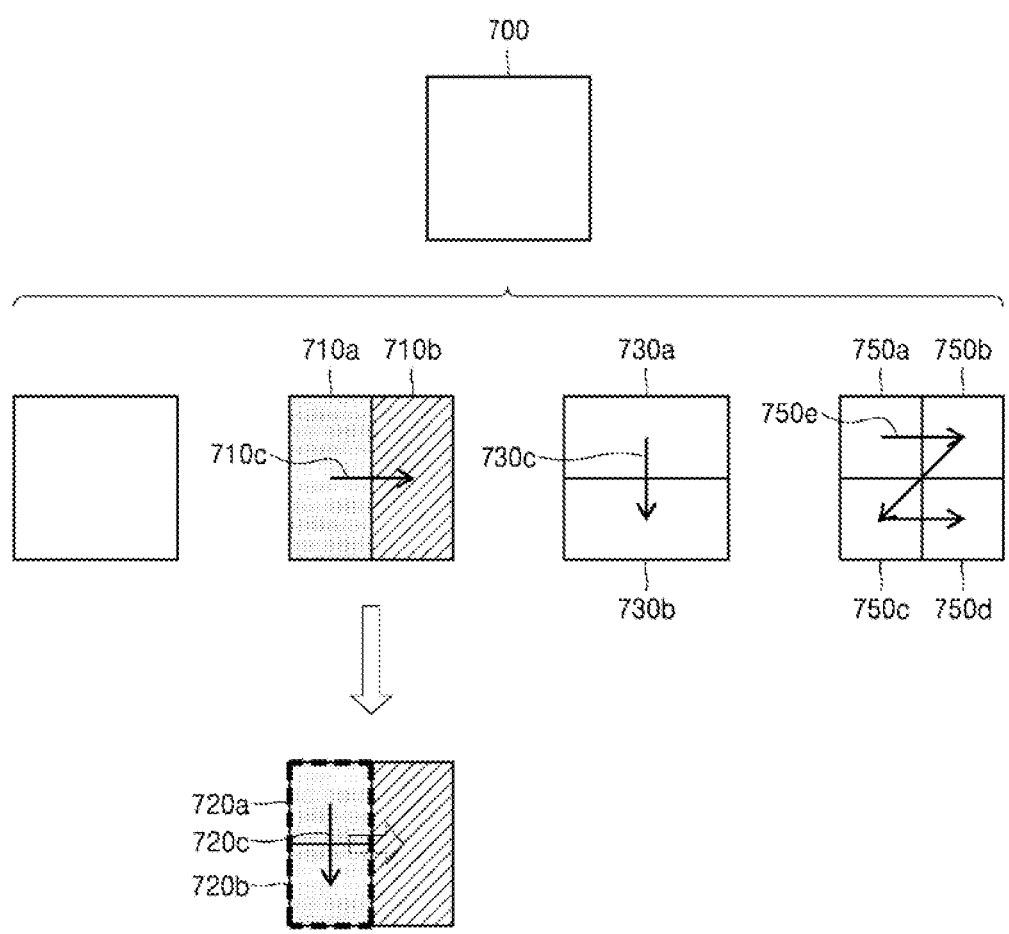
FIG. 7 illustrates an order of processing a plurality of coding units when the image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710*a* and 710*b* by splitting a first coding unit 700 in a vertical direction, may determine second coding units 730*a* and 730*b* by splitting the first coding unit 700 in a horizontal direction, or may determine second coding units 750*a* to 750*d* by splitting the first coding unit 700 in vertical and horizontal directions, based on at least one of block shape information and split shape mode information.

Referring to FIG. 7, the image decoding apparatus 100 may determine to process the second coding units 710*a* and 710*b* in a horizontal direction order 710*c*, the second coding units 710*a* and 710*b* being determined by splitting the first coding unit 700 in a vertical direction. The image decoding apparatus 100 may determine to process the second coding units 730*a* and 730*b* in a vertical direction order 730*c*, the second coding units 730*a* and 730*b* being determined by splitting the first coding unit 700 in a horizontal direction. The image decoding apparatus 100 may determine the second coding units 750*a*, 750*b*, 750*c*, and 750*d*, which are determined by splitting the first coding unit 700 in vertical and horizontal directions, according to a preset order (e.g., in a raster scan order or Z-scan order 750*e*) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710*a* and 710*b*, 730*a* and 730*b*, or 750*a*, 750*b*, 750*c*, and 750*d* by splitting the first coding unit 700, and may recursively split each of the determined plurality of coding units 710*a* and 710*b*, 730*a* and 730*b*, or 750*a*, 750*b*, 750*c*, and 750*d*. A splitting method of the plurality of coding units 710*a* and 710*b*, 730*a* and 730*b*, or 750*a*, 750*b*, 750*c*, and 750*d* may correspond to a splitting method of the first coding unit 700. Accordingly, each of the plurality of coding units 710*a* and 710*b*, 730*a* and 730*b*, or 750*a*, 750*b*, 750*c*, and 750*d* may be independently split into a plurality of coding units. Referring to FIG. 7, the image decoding apparatus 100 may determine the second coding units 710*a* and 710*b* by splitting the first coding unit 700 in a vertical direction, and may determine to independently split each of the second coding units 710*a* and 710*b* or not to split the second coding units 710*a* and 710*b*.

According to an embodiment, the image decoding apparatus 100 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Because the left and right second coding units 710*a* and 710*b* are processed in the horizontal direction order 710c, the right second coding unit 710b may be processed after the third coding units 720a and 720b included in the left second coding unit 710a are processed in the vertical direction order 720c. It should be construed that an operation of determining a processing order of coding units based on a coding unit before being split is not limited to the aforementioned example, and various methods may be used to independently process coding units, which are split and determined to various shapes, in a preset order.

Figure 8:
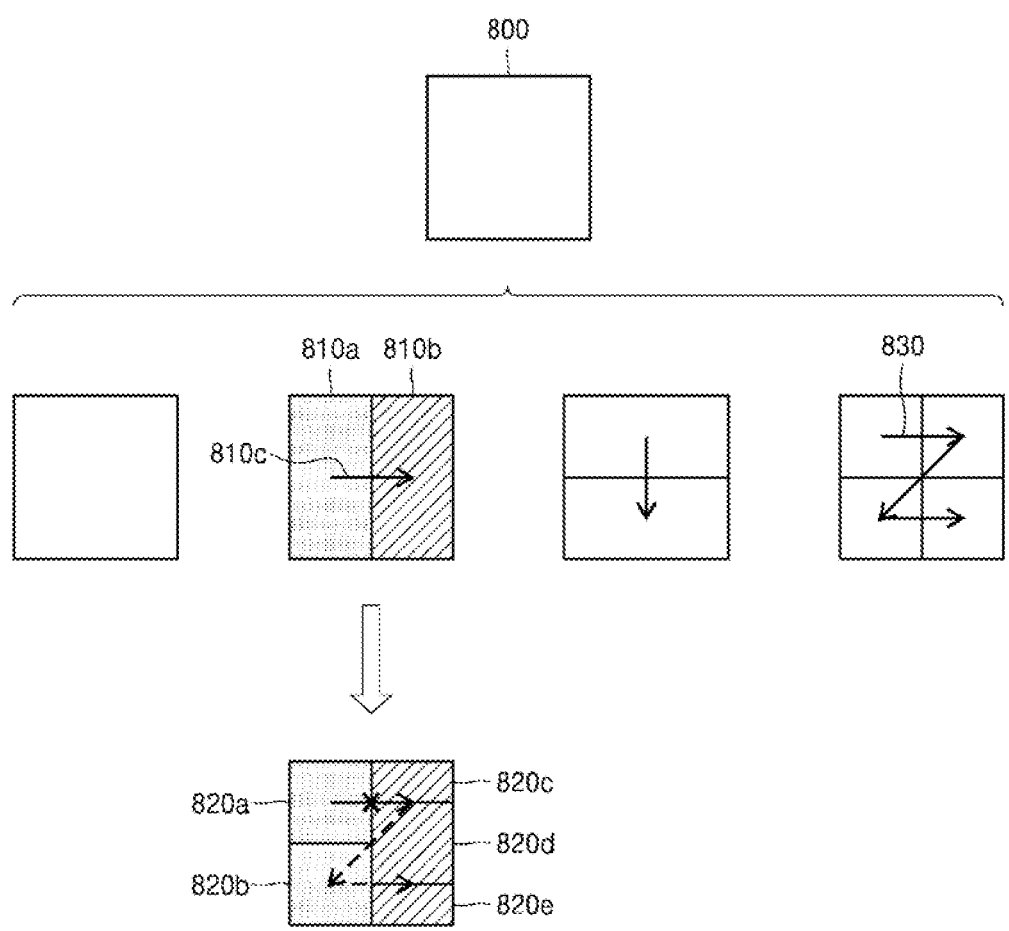
FIG. 8 illustrates a process, performed by the image decoding apparatus, of determining that a current coding unit is to be split into an odd number of coding units, when the coding units are not processable in a preset order, according to an embodiment.

FIG. 8 illustrates a process, performed by the image decoding apparatus 100, of determining that a current coding unit is to be split into an odd number of coding units, when the coding units are not processable in a preset order, according to an embodiment.

According to an embodiment, the image decoding apparatus 100 may determine that the current coding unit is to be split into an odd number of coding units, based on obtained block shape information and split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the image decoding apparatus 100 may determine whether there are an odd number of split coding units, by determining whether the third coding units 820a and 820b, and 820c, 820d, and 820e are processable in a preset order. Referring to FIG. 8, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e is to be split into an odd number of coding units, based on at least one of the block shape information and the split shape mode information. For example, the second coding unit 810b located in the right from among the second coding units 810a and 810b may be split into an odd number of third coding units 820c, 820d, and 820e. A processing order of a plurality of coding units included in the first coding unit 800 may be a preset order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the preset order.

According to an embodiment, the image decoding apparatus 100 may determine whether the third coding units 820a and 820b, and 820c, 820d, and 820e included in the first coding unit 800 satisfy the condition for processing in the preset order, and the condition relates to whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a preset restriction on a coding unit at a preset location from among the split coding units. The restriction or the preset location is described above in relation to various embodiments, and thus detailed descriptions thereof are not provided herein.

Figure 9:
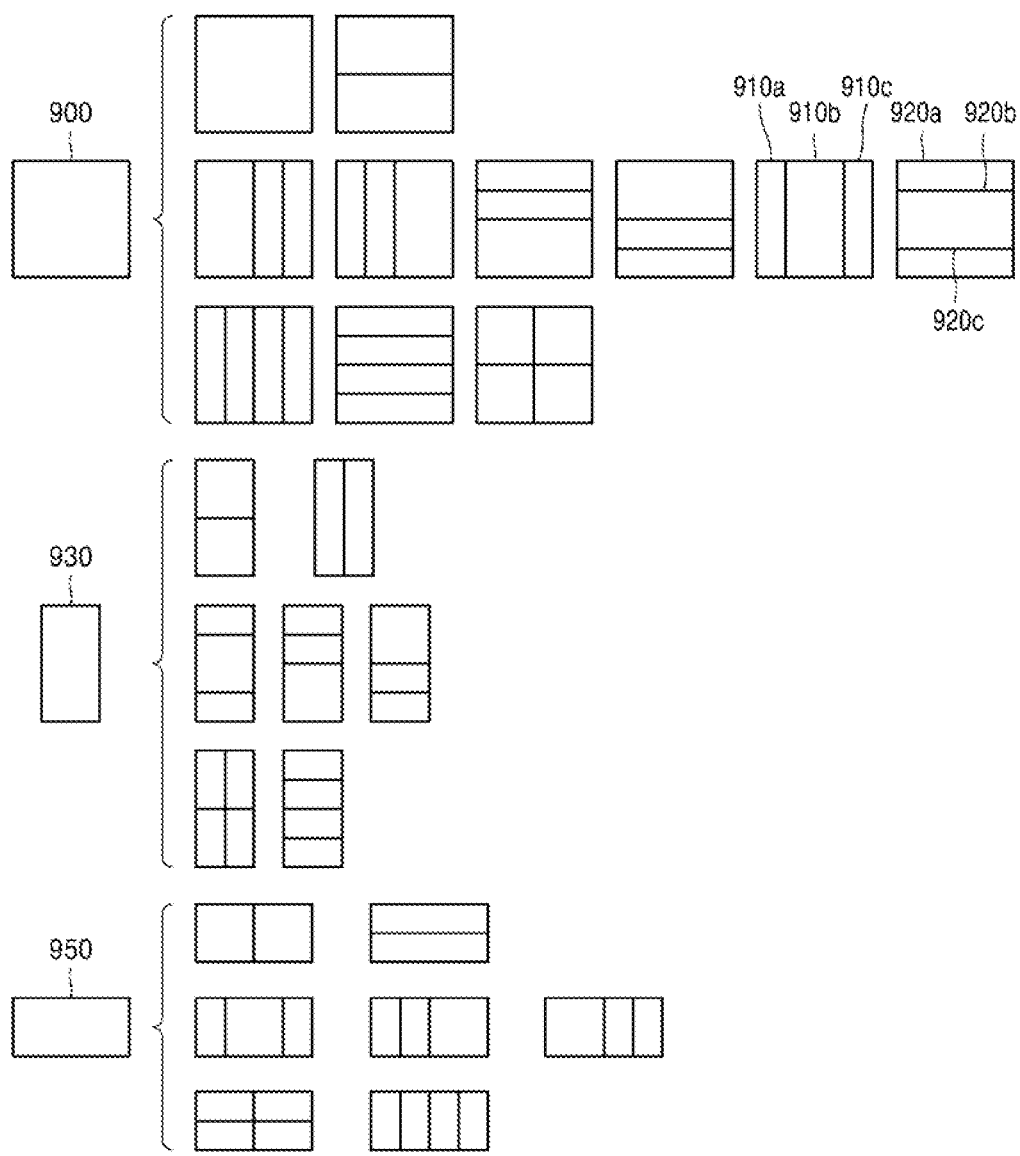
FIG. 9 illustrates a process, performed by the image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on at least one of block shape information and split shape mode information that is obtained through a receiver (not shown). The square first coding unit 900 may be split into four square coding units, or may be split into a plurality of non-square coding units. For example, referring to FIG. 9, when the block shape information indicates that the first coding unit 900 is a square and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a preset order, and the condition relates to whether at least one of a width and height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the preset order. In addition, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the preset order. When the condition is not satisfied as described above, the image decoding apparatus 100 may determine disconnection of a scan order, and may determine that the first coding unit 900 is to be split into an odd number of coding units, based on a result of the determination. According to an embodiment, when a coding unit is split into an odd number of coding units, the image decoding apparatus 100 may put a preset restriction on a coding unit at a preset location from among the split coding units. The restriction or the preset location is described above in relation to various embodiments, and thus detailed descriptions thereof are not provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
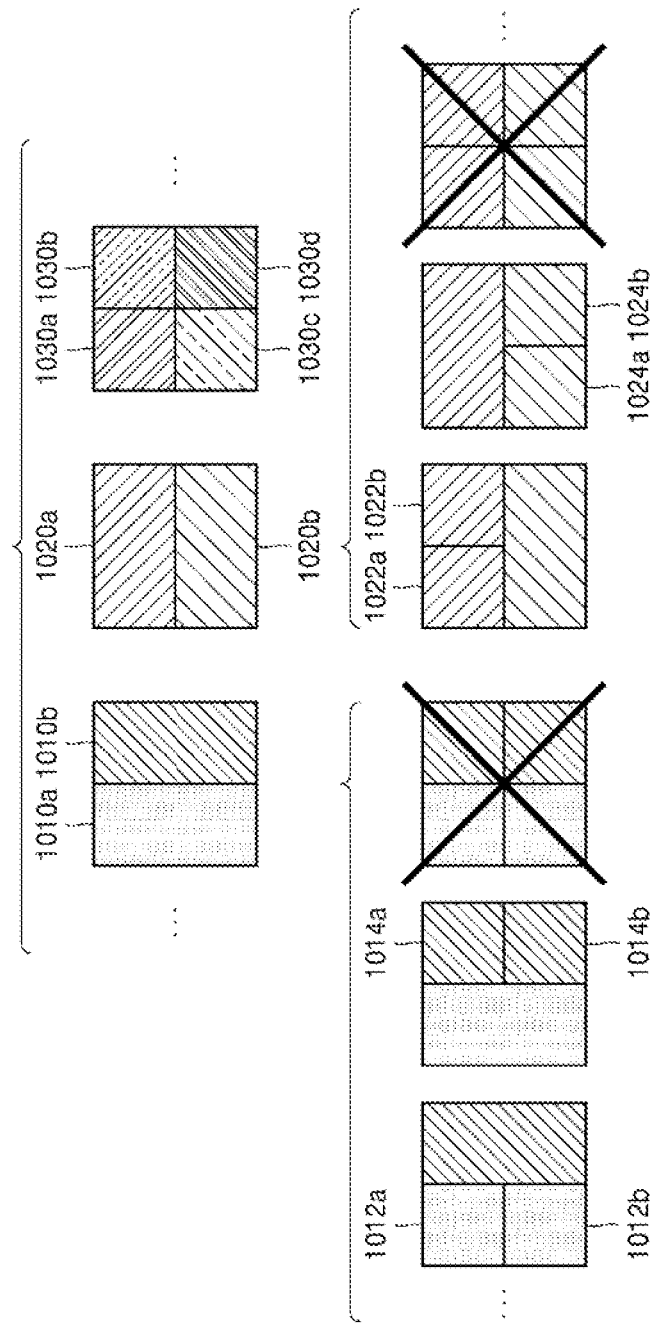
FIG. 10 illustrates that a shape into which a second coding unit is splittable is restricted when the second coding unit having a non-square shape, which is determined as the image decoding apparatus splits a first coding unit, satisfies a preset condition, according to an embodiment.

FIG. 10 illustrates that a shape into which a second coding unit is splittable is restricted when the second coding unit having a non-square shape, which is determined as the image decoding apparatus 100 splits a first coding unit 1000, satisfies a preset condition, according to an embodiment.

According to an embodiment, the image decoding apparatus 100 may determine to split the square first coding unit 1000 into non-square second coding units 1010a and 1010b or 1020a and 1020b, based on at least one of block shape information and split shape mode information which is obtained by the receiver (not shown). The second coding units 1010a and 1010b or 1020a and 1020b may be independently split. Accordingly, the image decoding apparatus 100 may determine to split or not to split each of the second coding units 1010a and 1010b or 1020a and 1020b into a plurality of coding units, based on at least one of block shape information and split shape mode information about each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left second coding unit 1010a and the right second coding unit 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on at least one of the block shape information and the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the aforementioned reason, the image decoding apparatus 100 may restrict the other second coding unit (e.g., the lower second coding unit 1020b) to not be split in a vertical direction in which the upper second coding unit 1020a is split.

Figure 11:
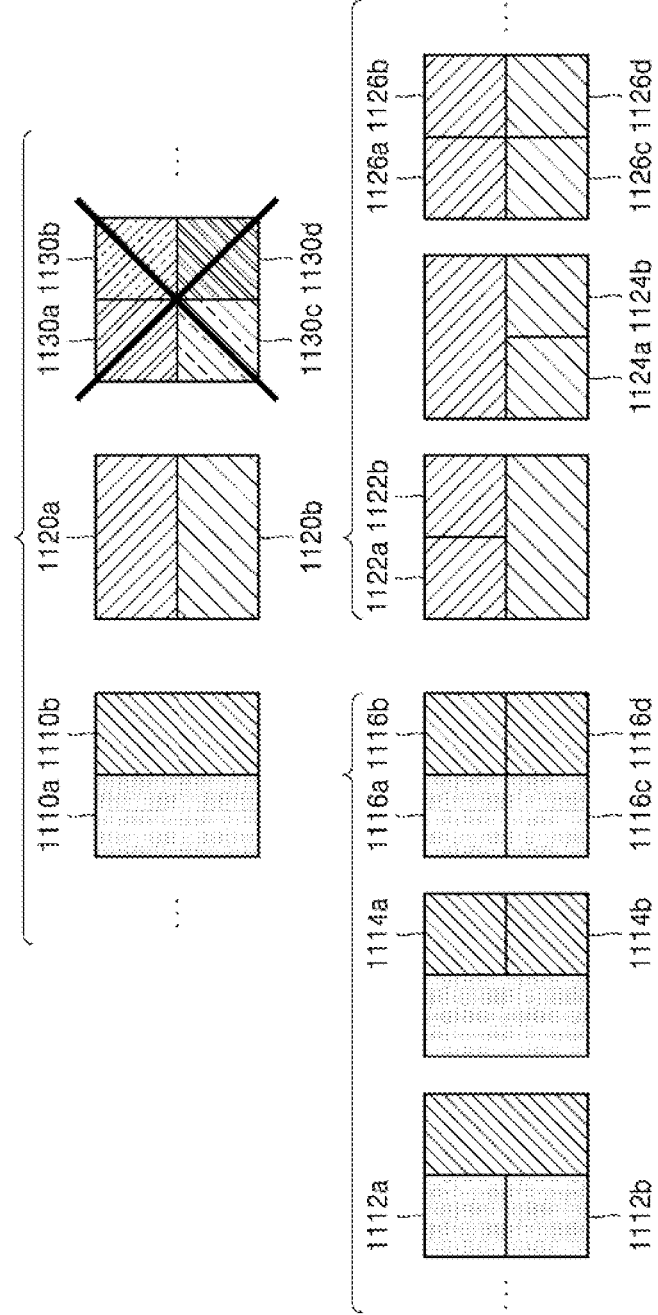
FIG. 11 illustrates a process, performed by the image decoding apparatus, of splitting a square coding unit when split shape mode information indicates that the square coding unit is to not be split into four square coding units, according to an embodiment.

FIG. 11 illustrates a process, performed by the image decoding apparatus 100, of splitting a square coding unit when split shape mode information indicates that the square coding unit is to not be split into four square coding units, according to an embodiment.

According to an embodiment, the image decoding apparatus 100 may determine second coding units 1110a and 1110b or 1120a and 1120b, etc. by splitting a first coding unit 1100, based on at least one of block shape information and split shape mode information. The split shape mode information may include information about various methods of splitting a coding unit, but the information about various splitting methods may not include information for splitting a coding unit into four square coding units. Based on the split shape mode information, the image decoding apparatus 100 does not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a preset order, and this splitting method may correspond to a method of splitting the first coding unit 1100, based on at least one of the block shape information and the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both the left second coding unit 1110a and the right second coding unit 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper second coding unit 1120a and the lower second coding unit 1120b in a vertical direction. In this case, coding units having the same shape as the four square second coding units 1130a, 1130b, 1130c, and 1130d split from the first coding unit 1100 may be determined.

Figure 12:
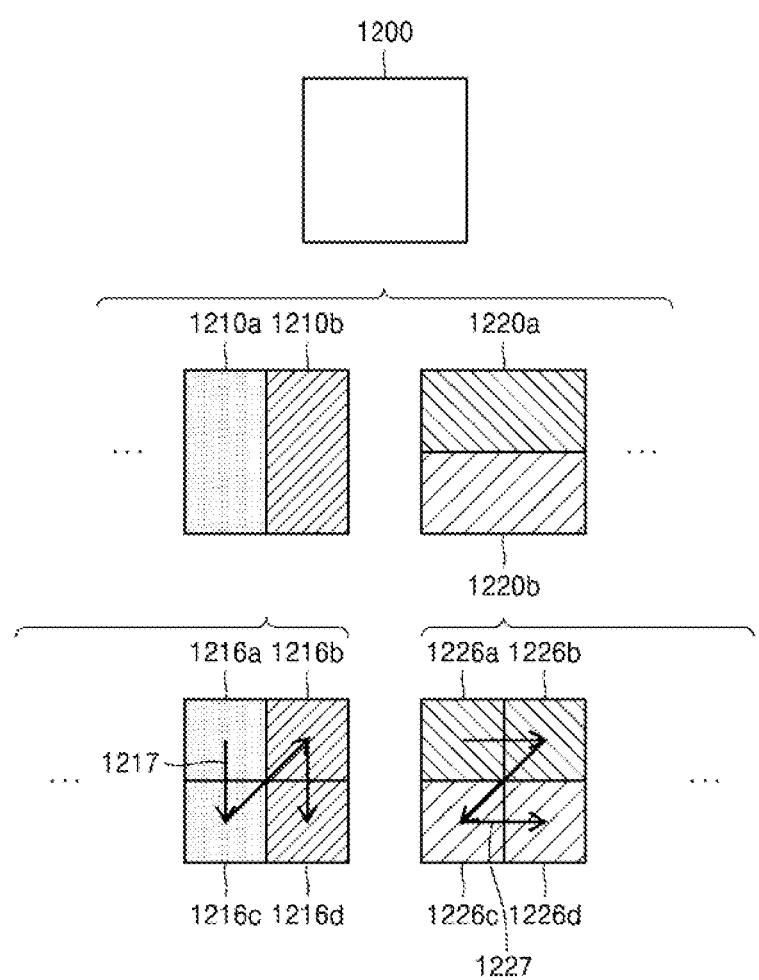
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on at least one of block shape information and split shape mode information. When the block shape information indicates a square shape and the split shape mode information indicates to split the first coding unit 1200 in at least one of horizontal and vertical directions, the image decoding apparatus 100 may determine second coding units 1210a and 1210b or 1220a and 1220b, etc. by splitting the first coding unit 1200. Referring to FIG. 12, the non-square second coding units 1210a and 1210b or 1220a and 1220b determined by splitting the first coding unit 1200 in only a horizontal direction or vertical direction may be independently split based on at least one of block shape information and split shape mode information about each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b or 1220a and 1220b is described above with reference to FIG. 11, and thus detailed descriptions thereof are not provided herein.

According to an embodiment, the image decoding apparatus 100 may process coding units in a preset order. An operation of processing coding units in a preset order is described above with reference to FIG. 7, and thus detailed descriptions thereof are not provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d, based on a split shape by which the first coding unit 1200 is split.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. Accordingly, by recursively splitting a coding unit in different manners based on at least one of block shape information and split shape mode information, the image decoding apparatus 100 may process a plurality of coding units in different orders even when the coding units are eventually determined to have the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than its width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
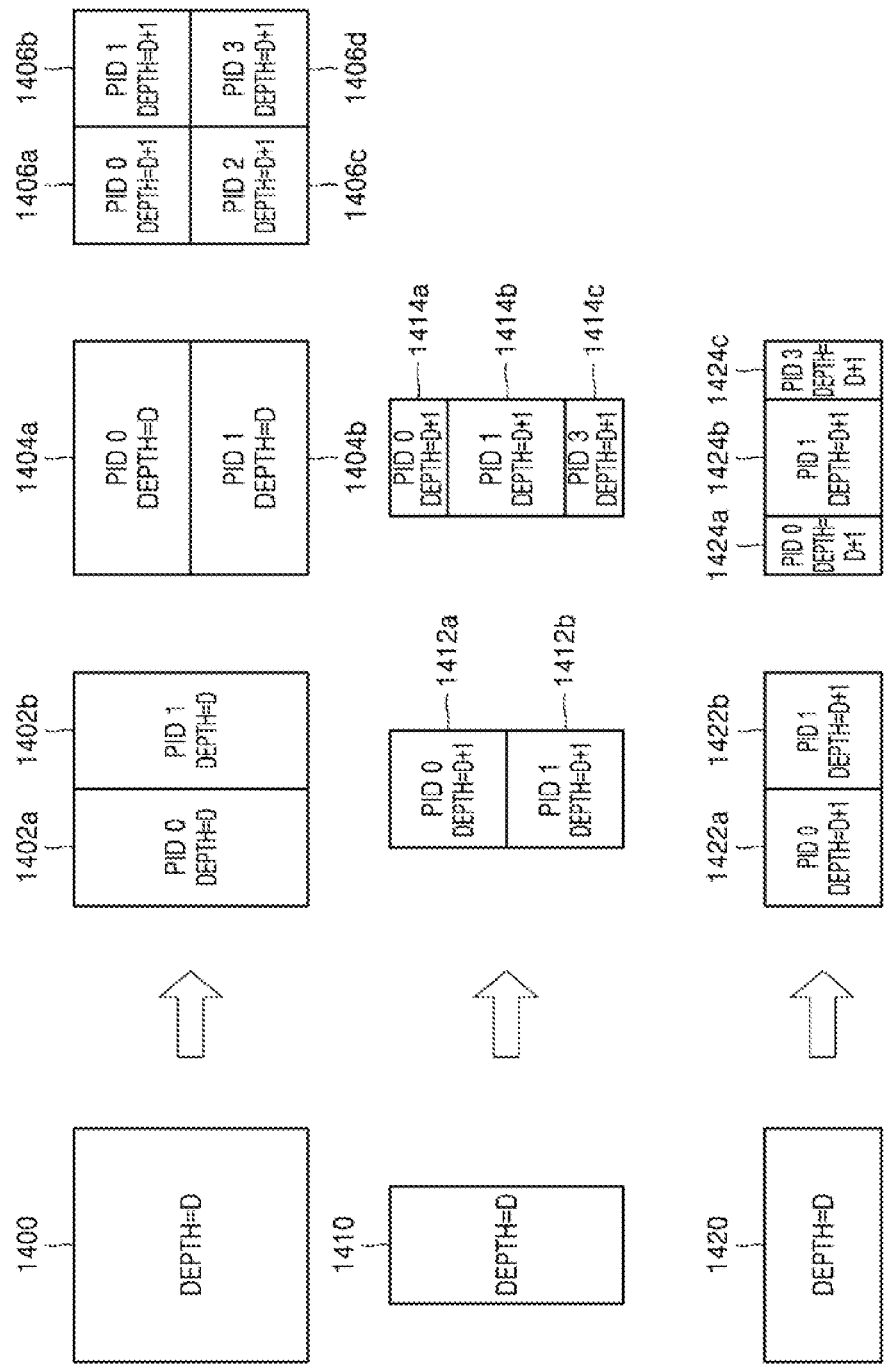
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than its width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than its height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than its width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than its height, by using the aforementioned method of determining depths of coding units split from the first coding unit 1410.

According to an embodiment, the image decoding apparatus 100 may determine PIDs for identifying split coding units, based on a size ratio between the coding units when an odd number of split coding units do not have equal sizes.

Referring to FIG. 14, a coding unit 1414b of a center location among an odd number of split coding units 1414a, 1414b, and 1414c may have a width being equal to that of the other coding units 1414a and 1414c and a height being twice that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a particular splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than its width. The image decoding apparatus 100 may use PIDs indicating respective coding units so as to identify the respective coding units. According to an embodiment, the PID may be obtained from a sample at a preset location of each coding unit (e.g., an upper left sample).

According to an embodiment, the image decoding apparatus 100 may determine a coding unit at a preset location from among the split coding units, by using the PIDs for distinguishing the coding units. According to an embodiment, when the split shape mode information of the first coding unit 1410 having a rectangular shape, a height of which is longer than its width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units so as to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width being equal to that of the other coding units 1414a and 1414c and a height being twice that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a preset location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the preset location are not limited to the aforementioned examples, and various PIDs and various locations and sizes of coding units may be used.

According to an embodiment, the image decoding apparatus 100 may use a preset data unit where a coding unit starts to be recursively split.

Figure 15:
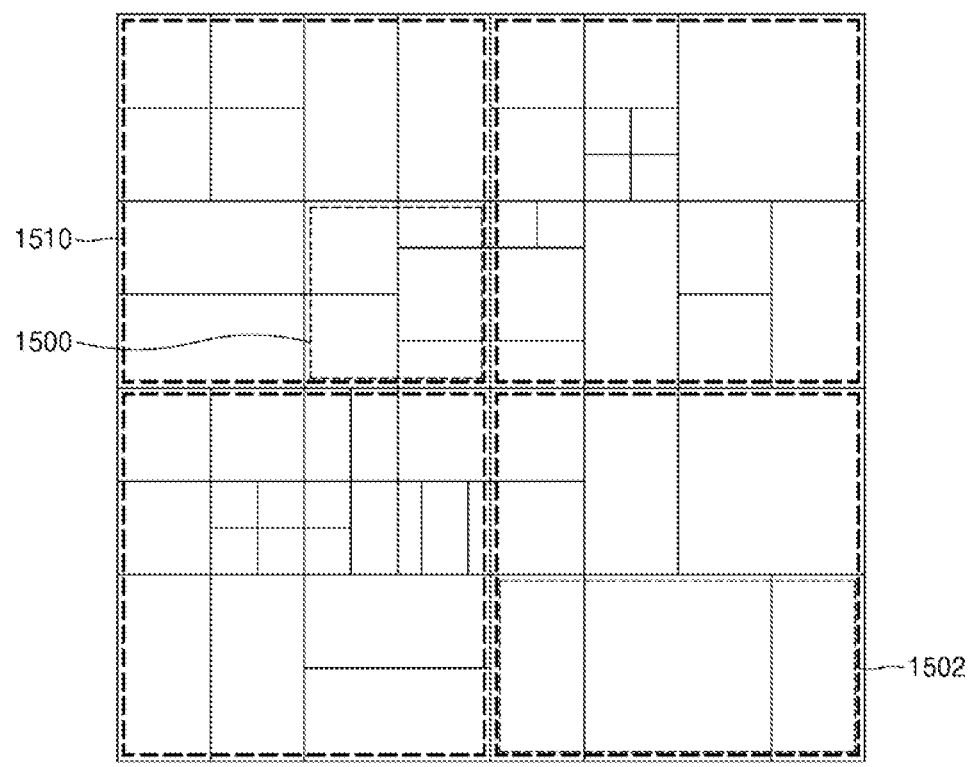
FIG. 15 illustrates that a plurality of coding units are determined based on a plurality of preset data units included in a picture, according to an embodiment.

FIG. 15 illustrates that a plurality of coding units are determined based on a plurality of preset data units included in a picture, according to an embodiment.

According to an embodiment, a preset data unit may be defined as a data unit where a coding unit starts to be recursively split by using at least one of block shape information and split shape mode information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset shape. According to an embodiment, the reference data unit may include M×N samples. Herein, M and N may be equal to each other, and may be integers expressed as powers of 2. That is, the reference data unit may have a square or non-square shape, and then may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the block shape information and the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units that may include one or more reference coding units (e.g., sequences, pictures, slices, slice segments, tiles, tile groups, largest coding units, or the like).

According to an embodiment, the receiver (not shown) of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a preset condition. That is, the receiver (not shown) may obtain, from the bitstream, only the PID for identifying the size and shape of reference coding units with respect to each slice, each slice segment, each tile, each tile group, or each largest coding unit which is a data unit satisfying a preset condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from an image may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
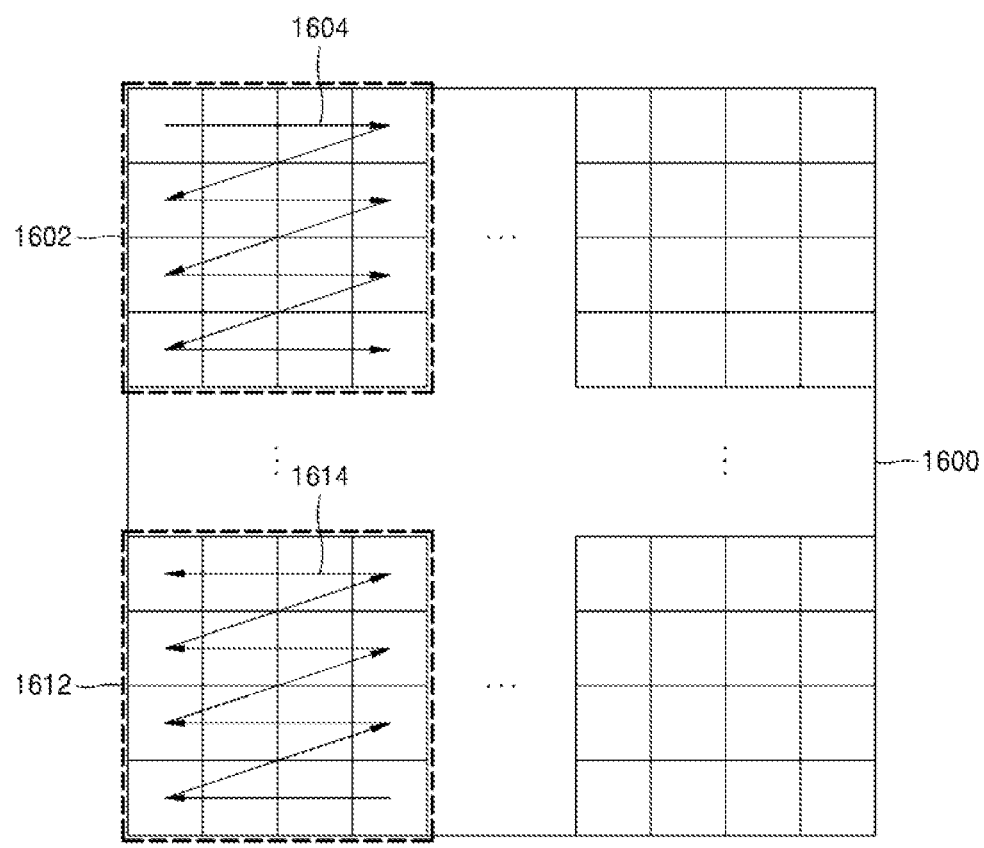
FIG. 16 illustrates a processing block serving as a criterion for determining a determination order of reference coding units included in a picture, according to an embodiment.

FIG. 16 illustrates a processing block serving as a criterion for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a particular order. That is, a determination order of one or more reference coding units determined in each of processing blocks may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the aforementioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a preset size of data units, which is indicated by the processing block size information.

According to an embodiment, the receiver (not shown) of the image decoding apparatus 100 may obtain the processing block size information from the bitstream according to each particular data unit. For example, the processing block size information may be obtained from the bitstream in a data unit such as an image, sequence, picture, slice, slice segment, or the like. That is, the receiver (not shown) may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each particular data unit. For example, the receiver (not shown) may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained with respect to each particular data unit including an integer number of processing blocks.

According to an embodiment, the image decoding apparatus 100 may determine one or more reference coding units based on the determined determination order.

According to an embodiment, the receiver (not shown) may obtain the determination order information of reference coding units from the bitstream as information related to the processing blocks 1602 and 1612, and the image decoding apparatus 100 may determine a determination order of one or more reference coding units included in the processing blocks 1602 and 1612 and may determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain, from the bitstream, block shape information indicating the shape of a current coding unit or split shape mode information indicating a splitting method of the current coding unit, and may use the obtained information. The block shape information or the split shape mode information may be included in the bitstream related to various data units. For example, the image decoding apparatus 100 may use the block shape information or the split shape mode information which is included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

With reference of FIGS. 17 to 20, an image encoding apparatus and an image decoding apparatus, and an image encoding method and an image decoding method for encoding or decoding an image based on various-shape coding units according to various embodiments will be described.

Figure 17A:
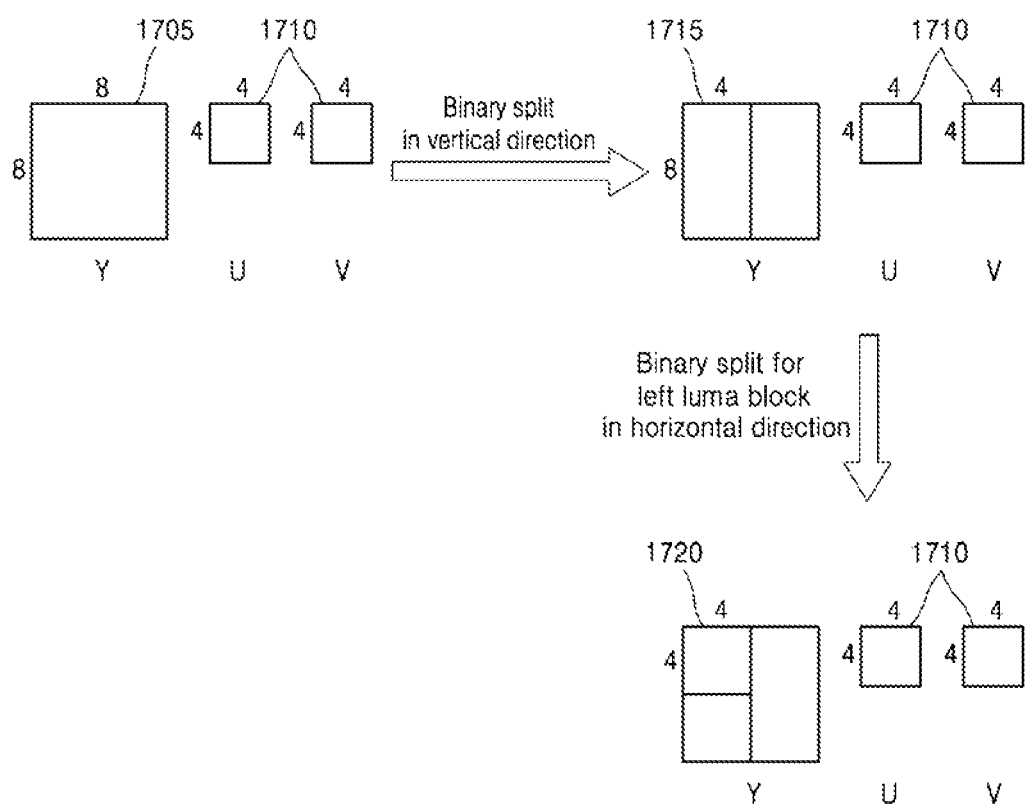
FIGS. 17A and 17B are diagrams for describing a method by which splitting to chroma blocks whose size is equal to or smaller than a preset size is not allowed when a splitting tree type indicates a single tree, according to various embodiments.
Figure 17B:
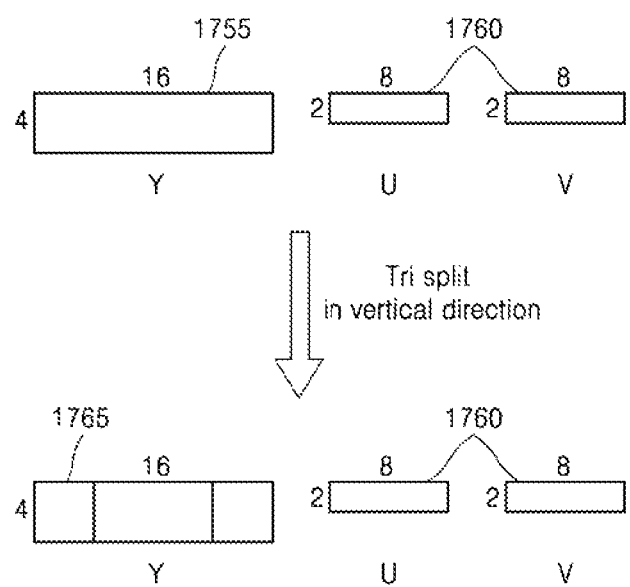
Figure 18:
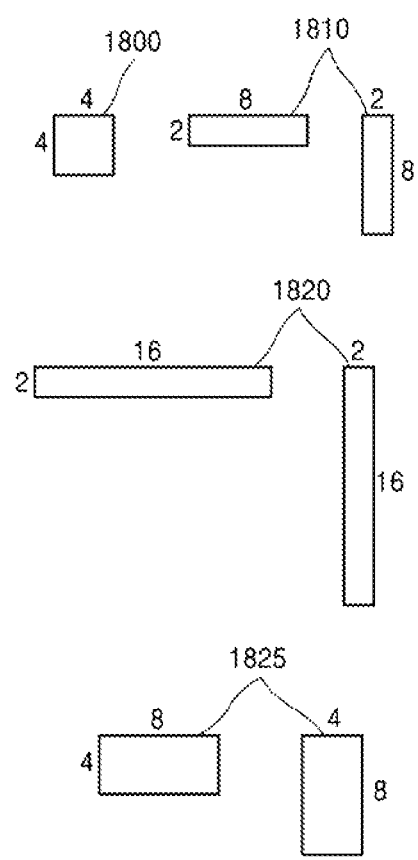
FIG. 18 is a diagram for describing a method by which splitting of a chroma block whose size is equal to or smaller than a preset size is not allowed when a splitting tree type indicates a dual tree, according to an embodiment.

FIGS. 17 and 18 are diagrams for describing a method by which splitting to chroma blocks whose size is equal to or smaller than a preset size is not allowed according to a splitting tree type, according to various embodiments.

FIGS. 17A and 17B are diagrams for describing a method by which splitting to chroma blocks whose size is equal to or smaller than a preset size is not allowed when a splitting tree type indicates a single tree, according to various embodiments.

FIG. 17A is a diagram for describing a method by which splitting of a chroma block whose size is equal to or smaller than a preset size is not allowed when a splitting tree type indicates a single tree, according to an embodiment.

When the splitting tree type indicates the single tree, a tree structure of coding units of a luma image and a tree structure of coding units of a chroma image may be determined based on one tree structure of coding units.

Referring to FIG. 17A, when the splitting tree type indicates the single tree, the image decoding apparatus 100 may binary split a luma block 1705 and a corresponding chroma block 1710 in a vertical direction. The image decoding apparatus 100 may determine an allowable minimum size of a luma block to be 4×4, and because a size of a block 1715 to be generated due to binary splitting in the vertical direction is greater than the allowable minimum size of the luma block, the image decoding apparatus 100 may binary split the luma block 1705 in the vertical direction.

The image decoding apparatus 100 may determine an allowable minimum size of a chroma block to be 4×4, and because a size of a block to be generated due to binary splitting in a vertical direction is smaller than the allowable minimum size of the chroma block, the image decoding apparatus 100 may determine to not split the chroma block 1710.

The image decoding apparatus 100 may binary split the luma block 1715 and the corresponding chroma block 1710 in a horizontal direction. The image decoding apparatus 100 may determine an allowable minimum size of a luma block to be 4×4, and because a size of a block 1720 to be generated due to binary splitting in the horizontal direction is equal to the allowable minimum size of the luma block, the image decoding apparatus 100 may binary split the luma block 1715 in the horizontal direction.

The image decoding apparatus 100 may determine an allowable minimum size of a chroma block to be 4×4, and because a size of a block to be generated due to binary splitting in a horizontal direction is smaller than the allowable minimum size of the chroma block, the image decoding apparatus 100 may determine to not split the chroma block 1710 any more.

FIG. 17B is a diagram for describing a method by which splitting to chroma blocks whose size is equal to or smaller than a preset size is not allowed when a splitting tree type indicates a single tree, according to an embodiment.

FIG. 17B is a diagram for describing a method by which splitting to chroma blocks whose size is equal to or smaller than a preset size is not allowed when a splitting tree type indicates a single tree, according to another embodiment.

Referring to FIG. 17B, when the splitting tree type indicates the single tree, the image decoding apparatus 100 may tri split a luma block 1755 and a corresponding chroma block 1760 in a vertical direction. The image decoding apparatus 100 may determine an allowable minimum area of a luma block to be 16, and because an area of a block 1765 to be generated due to tri splitting in the vertical direction is equal to or greater than the allowable minimum area of the luma block, the image decoding apparatus 100 may tri split the luma block 1755 in the vertical direction.

The image decoding apparatus 100 may determine an allowable minimum area of a chroma block to be 16, and because an area of a block to be generated due to tri splitting in a vertical direction is smaller than the allowable minimum area of the chroma block, the image decoding apparatus 100 may determine to not split the chroma block 1760.

FIG. 18 is a diagram for describing a method by which splitting of a chroma block whose size is equal to or smaller than a preset size is not allowed when a splitting tree type indicates a dual tree, according to an embodiment.

When the splitting tree type indicates the dual tree, a tree structure of coding units of a luma image and a tree structure of coding units of a chroma image may be separately determined.

Referring to FIG. 18, the image decoding apparatus 100 may determine an allowable minimum size of a chroma block to be 4×4, and because a size of blocks to be generated by splitting chroma blocks 1800, 1810, 1820, and 1825 according to a particular split type is smaller than 4×4 that is the allowable minimum size of the chroma block, the image decoding apparatus 100 may determine to not split a chroma block 1800 according to the particular split type.

When a split type of the chroma block 1800 indicates a quad split, a size of a block to be generated by quad splitting the chroma block 1800 is 2×2 smaller than 4×4 that is the allowable minimum size, and thus, the image decoding apparatus 100 may determine to not split the chroma block 1800 according to quad split. In this regard, as a condition based on the size of the chroma block 1800, the image decoding apparatus 100 may determine whether the size of the block to be generated due to splitting is smaller than 4×4 that is the allowable minimum size. For example, the image decoding apparatus 100 may determine whether a height or a width of the chroma block 1800 is equal to or smaller than 4, and in response to a result of the determination, the image decoding apparatus 100 may determine that the size of the block to be generated due to splitting is smaller than 4×4 that is the allowable minimum size.

When a split type of the chroma block 1810 indicates binary split, a size of a block to be generated by binary splitting the chroma block 1810 is 4×2 or 2×4 which is smaller than 4×4 that is the allowable minimum size, and thus, the image decoding apparatus 100 may determine to not split the chroma block 1810 according to binary split. In this regard, as a condition based on an area of the chroma block 1810, the image decoding apparatus 100 may determine whether the size of the block to be generated due to splitting is smaller than 4×4 that is the allowable minimum size. For example, the image decoding apparatus 100 may determine whether the area of the chroma block 1810 is equal to or smaller than 16, and in response to a result of the determination, the image decoding apparatus 100 may determine that the size of the block to be generated due to splitting is smaller than 4×4 that is the allowable minimum size.

When a split type of the chroma blocks 1820 and 1825 indicates tri split, a size of blocks to be generated by tri splitting the chroma blocks 1820 and 1825 is 4×2 or 2×4 which is smaller than 4×4 that is the allowable minimum size, and thus, the image decoding apparatus 100 may determine to not split chroma blocks 1820 and 1825 according to tri split.

In this regard, as a condition based on an area of the chroma blocks 1820 and 1825, the image decoding apparatus 100 may determine whether the size of the block to be generated due to splitting is smaller than 4×4 that is the allowable minimum size. For example, the image decoding apparatus 100 may determine whether the area of the chroma blocks 1820 and 1825 is equal to or smaller than 32, and in response to a result of the determination, the image decoding apparatus 100 may determine that the size of the block to be generated due to splitting is smaller than 4×4 that is the allowable minimum size.

The image decoding apparatus 100 may determine a coding unit of a chroma block to be always equal to or greater than an allowable minimum size, thereby improving a throughput in decoding of the chroma block.

Figure 19:
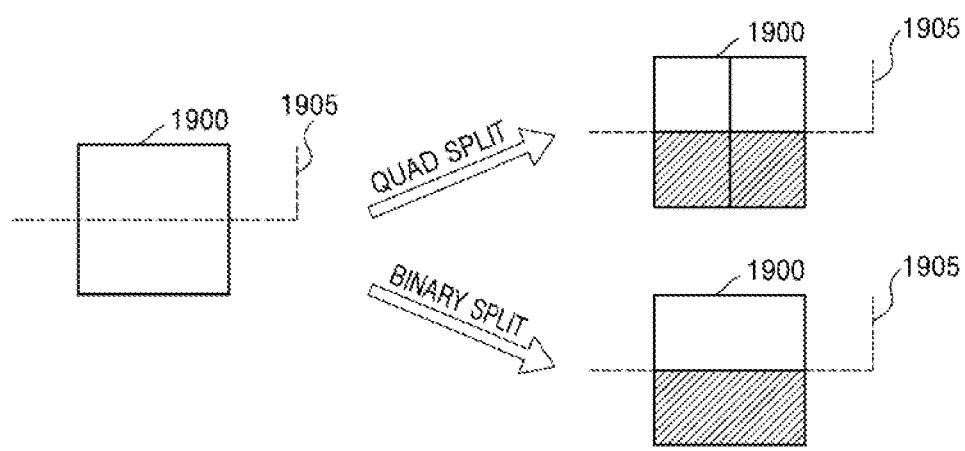
FIG. 19 is a diagram for describing a method of splitting a block, which is located at a boundary of a picture, by using a split shape mode based on a direction of the boundary, according to an embodiment.

FIGS. 19 and 20 are diagrams for describing a method of splitting a block at a boundary of a picture, according to various embodiments.

FIG. 19 is a diagram for describing a method of splitting a block, which is located at a boundary of a picture, by using a split shape mode based on a direction of the boundary, according to an embodiment.

The image decoding apparatus 100 may hierarchically quad split the block by recursively performing quad splitting. Here, a range of a size of a block to be generated due to quad splitting may be determined. The image decoding apparatus 100 may hierarchically quad split a block by recursively performing quad splitting within a range of a size of a block to be generated due to quad splitting.

The image decoding apparatus 100 may recursively perform binary splitting or tri splitting on the block generated due to hierarchical quad splitting. In this regard, a split depth of binary splitting or tri splitting may be predetermined. The image decoding apparatus 100 may recursively perform binary splitting or tri splitting on the block based on the predetermined split depth of binary splitting or tri splitting, the block being generated due to hierarchical quad splitting.

Referring to FIG. 19, when a current block 1900 is located at a picture boundary 1905, the image decoding apparatus 100 may not obtain split shape mode information from a bitstream and may split the current block 1900 according to a split shape mode allowed with respect to the current block 1900. For example, when an allowable split type of a split shape mode of a current block is tri split or binary split, the image decoding apparatus 100 may binary split (or tri split) the current block 1900. In this regard, a split direction may be determined to be a horizontal direction, based on a direction of the picture boundary 1905 of the current block 1900.

When the allowable split type of the split shape mode of the current block is not tri split nor binary split, the image decoding apparatus 100 may quad split the current block 1900.

The image decoding apparatus 100 may recursively split the current block 1900 until a block generated due to splitting is not located at the picture boundary 1905.

Figure 20A:
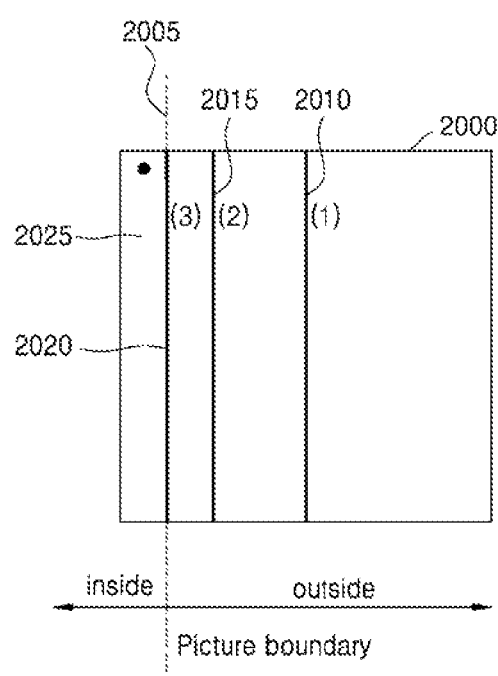
FIGS. 20A and 20B are diagrams for describing a method of splitting a block at a picture boundary according to whether a minimum size of a block is obtainable when the block at the picture boundary is binary split by applying an allowed binary split depth thereto, according to an embodiment.
Figure 20B:
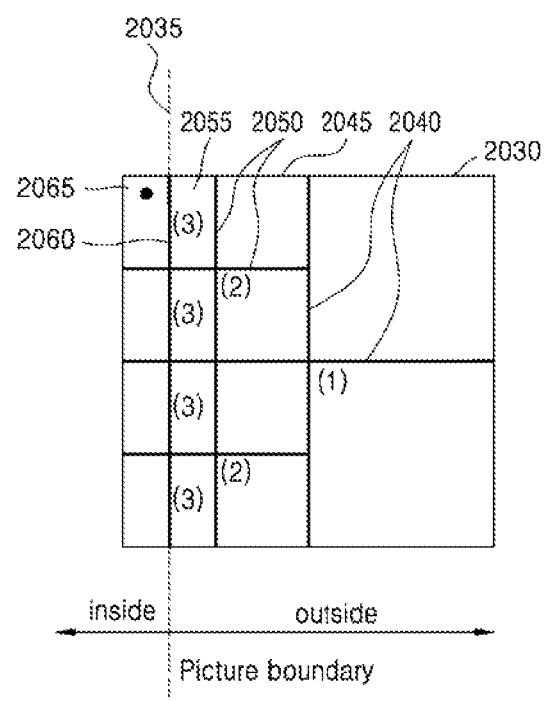

FIGS. 20A and 20B are diagrams for describing a method of splitting a block at a picture boundary according to whether a minimum size of a block is obtainable when the block at the picture boundary is binary split by applying an allowed binary split depth thereto, according to an embodiment.

Referring to FIG. 20A, in a case where a size of a current block 2000 is 128×128, an allowable split type of the current block 2000 is binary split, and an allowable split depth of the current block 2000 is 3, when the current block 2000 is located at an image boundary 2005 of a current picture, the image decoding apparatus 100 may perform binary splitting based on a first split boundary 2010, may perform binary splitting based on a second split boundary 2015, and may perform binary splitting based on a third split boundary 2020. Because binary splitting is performed as much as a binary split depth, the image decoding apparatus 100 cannot perform binary splitting any more. Therefore, a size of a block 2025 inside the image boundary 2005, the block 2025 being determined as a coding unit, may be 16×128. However, because the size of the block 2025 determined as a coding unit is not small, when the block 2025 includes various motion information and pixel value information, decoding efficiency deteriorates.

Referring to FIG. 20B, in a case where a size of a current block 2030 is 128×128, an allowable split type of the current block 2030 is binary split, and an allowable split depth of the current block 2030 is 3, when the current block 2030 is located at an image boundary 2035 of a current picture, the image decoding apparatus 100 may perform binary splitting when a size of a block to be generated due to recursive binary split from the current block 2030, in consideration of a size of the current block 2030 and an allowable split depth of binary split for the current block 2030, is equal to or smaller than a minimum block size (e.g., 4×4), and may perform quad splitting when a size of the block generated due to recursive binary split from the current block 2030, in consideration of the allowable split depth of binary split, is greater than the minimum block size.

Because the size of the block generated due to recursive binary split from the current block 2030, in consideration of the allowable split depth of binary split, is greater than the minimum block size, the image decoding apparatus 100 may perform quad splitting on the current block 2030, based on a first split boundary 2040.

Because a size of a block generated due to recursive binary split from a current block 2045, in consideration of a maximum allowable split depth of binary split, is greater than the minimum block size, the image decoding apparatus 100 may perform quad splitting on the current block 2040, based on a second split boundary 2050.

Because a size of a block generated due to recursive binary split from a current block 2055, in consideration of the maximum allowable split depth of binary split, is equal to or smaller than the minimum block size, the image decoding apparatus 100 may perform binary splitting on the current block 2055, based on a third split boundary 2060.

A size of a block 2065 inside the image boundary 2035, the block 2065 being generated by performing binary splitting on the current block 2055 based on the third split boundary 2060, is 16×32, and the image decoding apparatus 100 may additionally perform binary splitting on the block 2065. Therefore, unlike FIG. 20A, a size of a block determined as a coding unit may be small, and decoding efficiency may be relatively increased.

When the image decoding apparatus 100 determines a size of the current block 2000 or 2030 to be 128×128, determines an allowable split type of the current block 2000 or 2030 to be binary split, and determines an allowable split depth of the current block 2000 or 2030 to be 3, a method of splitting the current block 2000 or 2030 at a picture boundary is described above with reference to FIGS. 20A and 20B, but the disclosure is not limited thereto, and a current block located at a picture boundary may be split according to pseudocode.

| [Pseudocode] |
| --- |
| ```
bottom_boundary  // indication of whether current block
                 //   is bottom boundary of picture (0 when
                 //   located at boundary 0, 1 when not
                 //   located)
right_boundary   // indication of whether current block is
                 //   right boundary of picture (0 when
                 //   located at boundary 0, 1 when not
                 //   located)
max_bt_size      // maximum block size allowing binary-tree
                 //   (and triple-tree)
min_bt_size      // minimum block size
bt_depth         // allowed binary-tree (and triple-tree) depth
wGth             // width of current block
height           // height of current block
abs(v)           // indication of absolute value of v
log2(v) // value of log where base number of v is 2
        // (part for checking whether binary-tree is allowed)
        // = width > max bt size || height > max bt size ||
        // (part for checking whether minimum block size is
        //   obtainable when allowed binary-tree is applied)
        // abs(log2(width) − log2(min bt size)) > max bt depth ||
        // abs(log2(height) − log2(min bt size)) > max bt size
    if (!bottom_boundary || !right_boundary) && flag)
                       // (here abs( ) is
omittable)
        split by using quad-tree   // (user-set particular size
                                   // may be used,
instead of
                                   // min_bt_size)
    else if (!bottom_boundary)
        split by using binary-tree in horizontal direction
    else if (!right_boundary)
        split by using binary-tree in vertical direction
    else
        explicit determination of split mode
``` |

For example, in a case where the image decoding apparatus 100 that follows pseudocode above recursively performs splitting based on an allowed split depth according to binary split with respect to a greater value of a height or a width of a current block, when a corresponding side becomes a particular size (or smaller) (here, the particular size may be a minimum block size, or a size that is set by a user), the image decoding apparatus 100 may recursively split (split based on a binary tree) the current block according to binary split. Except for the aforementioned case, the image decoding apparatus 100 may split the current block according to quad split. In detail, in a case where an allowed binary split depth (bt_depth) is 3, only when a greater value from among a height and a width of the current block is equal to or smaller than a minimum size(min_bt_size)×2× 2×2 (i.e., a minimum size×8), the current block may be recursively split according to binary split.

With reference to FIGS. 20A and 20B, a method by which the image decoding apparatus 100 performs binary splitting or quad splitting, in consideration of a binary split depth, is described, but the disclosure is not limited thereto, and thus, one of ordinary skill in the art can easily understand that the image decoding apparatus 100 may binary split, tri split, or quad split a current block based on a binary (and tri) split depth, in a similar manner.

The disclosure has been particularly shown and described with reference to embodiments thereof. In this regard, it will be understood by one of ordinary skill in the art that various changes in form and details may be made therein without departing from the scope of the disclosure. Therefore, the embodiments should be considered in a descriptive sense only and not for purposes of limitation. The scope of the disclosure is defined not by the detailed descriptions of the disclosure but by the following claims, and all differences within the scope will be construed as being included in the disclosure.

Meanwhile, the aforedescribed embodiments of the disclosure can be written as a program executable on a computer, and can be implemented in general-use digital computers that execute the program by using a computer-readable recording medium. Examples of the computer-readable recording medium include magnetic storage media (e.g., ROM, floppy disks, hard disks, etc.), optical recording media (e.g., CD-ROMs, or DVDs), or the like.

The invention claimed is:

1. An image decoding method, comprising:
   obtaining one or more luma coding units based on at least one of a split direction and a split type of a luma block;
   decoding a luma image based on the obtained one or more luma coding units;
   when an area of a chroma block is smaller than or equal to an area predetermined according to tri split type of the chroma block, determining not to allow splitting of the chroma block according to the tri split type and obtaining one or more chroma coding units according to a split type except for the tri split type; and
   decoding a chroma image based on the obtained one or more chroma coding units according to the split type.

2. The image decoding method of claim 1, wherein the area predetermined according to the tri split type is 32.

3. An image decoding apparatus, comprising:
   at least one processor configured to:
   obtain one or more luma coding units based on at least one of a split direction and a split type of a luma block;
   decode a luma image based on the obtained one or more luma coding units;
   when an area of a chroma block is smaller than or equal to an area predetermined according to tri split type of the chroma block, determine not to allow splitting of the chroma block according to the tri split type and obtain one or more chroma coding units according to a split type except for the tri split type; and
   decode a chroma image based on the obtained one or more chroma coding units according to the split type.

4. An image encoding method, comprising:
   determining one or more luma coding units based on at least one of a split direction and a split type of a luma block;
   encoding a luma image based on the obtained one or more luma coding units;
   when an area of a chroma block is smaller than or equal to an area predetermined according to tri split type of the chroma block, determining not to allow splitting of the chroma block according to the tri split type and determining one or more chroma coding units according to a split type except for the tri split type; and
   encoding a chroma image based on the obtained one or more chroma coding units according to the split type.

5. A non-transitory computer-readable storage medium storing a bitstream, the bitstream being encoded by an image encoding method comprising:
   determining one or more luma coding units based on at least one of a split direction and a split type of a luma block;
   encoding a luma image based on the obtained one or more luma coding units;
   when an area of a chroma block is smaller than or equal to an area predetermined according to tri split type of the chroma block, determining not to allow splitting of the chroma block according to the tri split type and determining one or more chroma coding units according to a split type except for the tri split type; and
   encoding a chroma image based on the obtained one or more chroma coding units according to the split type.

* * * * *